(12) United States Patent  
Hagiwara

(10) Patent No.: US 11,822,064 B2  
(45) Date of Patent: Nov. 21, 2023

(54) ZOOM LENS AND IMAGE PICKUP APPARATUS

(71) Applicant: CANON KABUSHIKI KAISHA, Tokyo (JP)

(72) Inventor: Yasuaki Hagiwara, Tochigi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 90 days.

(21) Appl. No.: 17/235,965

(22) Filed: Apr. 21, 2021

(65) Prior Publication Data

US 2021/0333524 A1 Oct. 28, 2021

(30) Foreign Application Priority Data

Apr. 27, 2020 (JP) ................................. 2020-078301

(51) Int. Cl.
*G02B 15/14* (2006.01)
*G02B 15/16* (2006.01)

(52) U.S. Cl.
CPC ......... *G02B 15/1461* (2019.08); *G02B 15/16* (2013.01)

(58) Field of Classification Search
CPC ................................................ G02B 15/1461
See application file for complete search history.

(56) References Cited

U.S. PATENT DOCUMENTS

| 9,274,325 B2 | 3/2016 | Hagiwara | |
| 9,746,667 B2* | 8/2017 | Yonezawa | ...... G02B 15/145119 |
| 10,594,944 B2 | 3/2020 | Hagiwara | |
| 2016/0209632 A1* | 7/2016 | Imaoka | ............. G02B 15/1465 |
| 2019/0004296 A1* | 1/2019 | Sugita | .................... G02B 15/20 |
| 2019/0064491 A1* | 2/2019 | Sugita | ................ G02B 15/1461 |
| 2021/0103123 A1 | 4/2021 | Hagiwara | |

FOREIGN PATENT DOCUMENTS

| JP | 2001-108902 A | | 4/2001 | |
| JP | 2014-89385 A | | 5/2014 | |
| JP | 2014-157225 A | | 8/2014 | |
| JP | 2016-139125 A | | 8/2016 | |
| JP | 2019101286 A | * | 6/2019 | |
| WO | WO-2020105104 A1 | * | 5/2020 | ......... G02B 15/1441 |

OTHER PUBLICATIONS

English Translated WO 2020105104 A1 (Year: 2020).*
English Translated JP-2019101286 A (Year: 2019).*
Betensky, Zoom Lens Principles and Types, 1992, Proceedings of SPIE, vol. 10263, pp. 1026307-1-1026307-29 (Year: 1992).*

* cited by examiner

*Primary Examiner* — Wyatt A Stoffa
*Assistant Examiner* — Mayer Amitai Landau
(74) *Attorney, Agent, or Firm* — Carter, DeLuca & Farrell LLP

(57) ABSTRACT

A zoom lens includes, in order from an object side to an image side, a first lens unit having a positive refractive power, a second lens unit having a negative refractive power, a third lens unit having a positive refractive power, a fourth lens unit having a positive refractive power, a fifth lens unit having a negative refractive power, a sixth lens unit having a positive refractive power, and a seventh lens unit having a negative refractive power. During zooming, a distance between adjacent lens units changes, the first lens unit, the second lens unit, and a plurality of lens units among the third to seventh lens units move, and at least one of the fourth to seventh lens units is fixed.

25 Claims, 11 Drawing Sheets

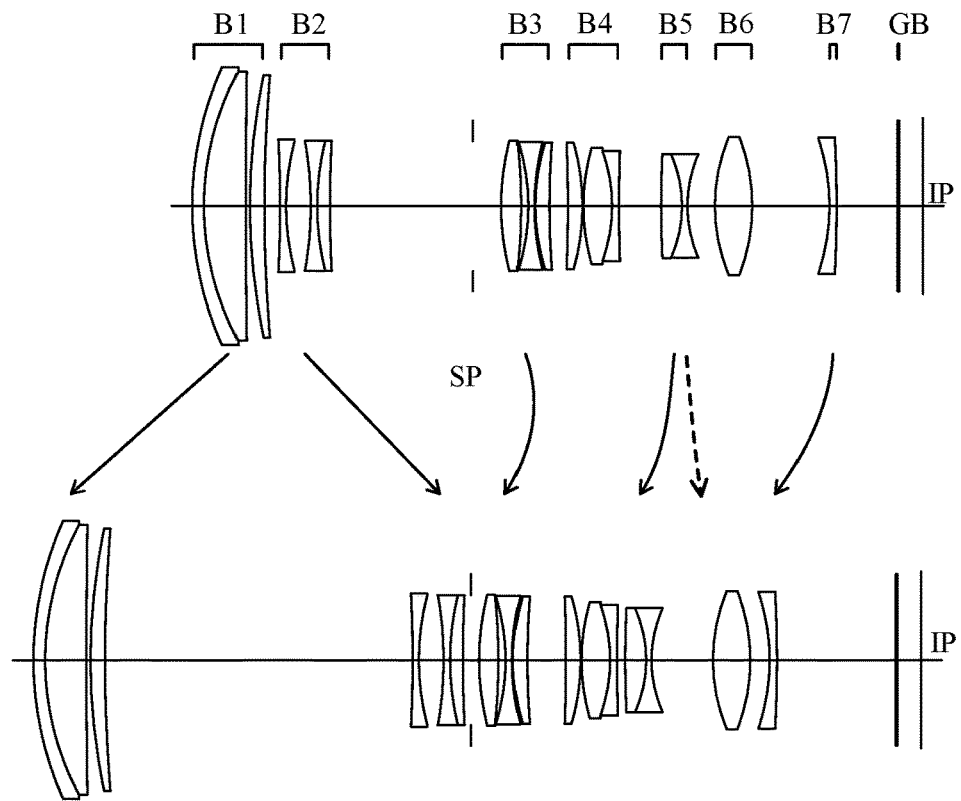
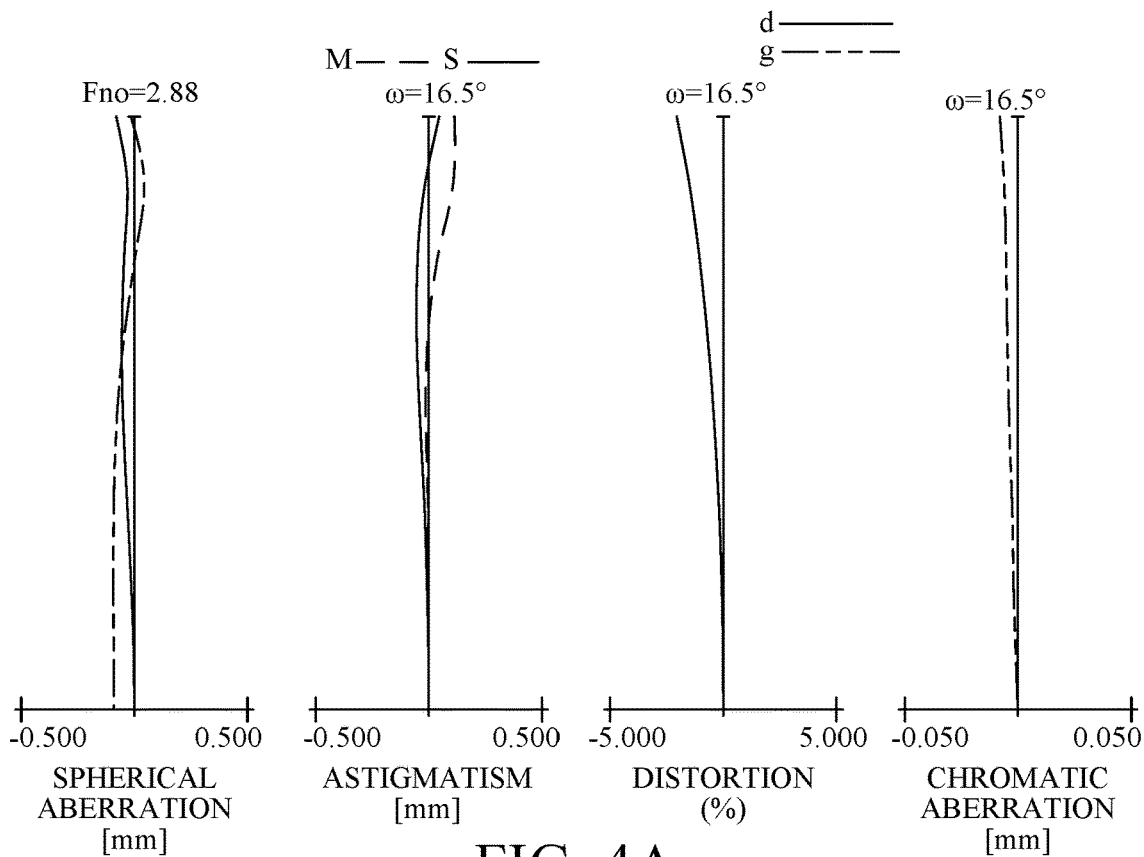
FIG. 3
FIG. 4A

ZOOM LENS AND IMAGE PICKUP APPARATUS

BACKGROUND OF THE INVENTION

Field of the Invention

The present invention relates to a zoom lens suitable for an image pickup apparatus, such as a video camera, an electronic still camera, a broadcasting camera, a surveillance camera, and a film-based camera.

Description of the Related Art

Japanese Patent Laid-Open Nos. ("JPs") 2016-139125 and 2001-108902 disclose zoom lenses each having a high zoom ratio and including, in order from an object side to an image side, a first lens unit having a positive refractive power, a second lens unit having a negative refractive power, a third lens unit having a positive refractive power, and a plurality of subsequent lens units.

In order to realize a good optical performance and a bright F-number in a zoom lens having a high zoom ratio configured as disclosed in JPs 2016-139125 and 2001-108902, it is important to properly arrange positive or negative refractive powers, and to properly set a lens unit or lens units to be moved during zooming, and a lens unit or lens units to be moved during focusing.

SUMMARY OF THE INVENTION

The present invention provides a zoom lens having a high zoom ratio, a good optical performance, and a bright F-number, and an image pickup apparatus having the zoom lens.

A zoom lens according to one aspect of the present invention includes, in order from an object side to an image side, a first lens unit having a positive refractive power, a second lens unit having a negative refractive power, a third lens unit having a positive refractive power, a fourth lens unit having a positive refractive power, a fifth lens unit having a negative refractive power, a sixth lens unit having a positive refractive power, and a seventh lens unit having a negative refractive power. During zooming, a distance between adjacent lens units changes, the first lens unit, the second lens unit, and a plurality of lens units among the third to seventh lens units move, and at least one of the fourth to seventh lens units is fixed.

A zoom lens according to another aspect of the present invention includes, in order from an object side to an image side, a 1A lens unit having a positive or negative refractive power, a 1B lens unit having a positive or negative refractive power, a second lens unit having a negative refractive power, a third lens unit having a positive refractive power, a fourth lens unit having a positive refractive power, a fifth lens unit having a negative refractive power, a sixth lens unit having a positive refractive power, and a seventh lens unit having a negative refractive power. The 1A and 1B lens units have a positive combined refractive power. During zooming, a distance between adjacent lens units changes, at least one of the 1A lens unit and the 1B lens unit, the second lens unit, and a plurality of lens units among the third to seventh lens units move, and at least one of the fourth to seventh lens units is fixed.

An image pickup apparatus having one of the above zoom lenses also constitutes another aspect of the present invention.

Further features of the present invention will become apparent from the following description of exemplary embodiments with reference to the attached drawings.

BRIEF DESCRIPTION OF THE DRAWINGS

FIG. 3 is a sectional view of a zoom lens according to Example 2.

FIG. 4A to 4C are aberrational diagrams at a wide-angle end (FIG. 4A), a middle zoom position (FIG. 4B), and a telephoto end (FIG. 4C) where the zoom lens according to Example 2 is in focus at infinity.

DESCRIPTION OF THE EMBODIMENTS

Figure 1:
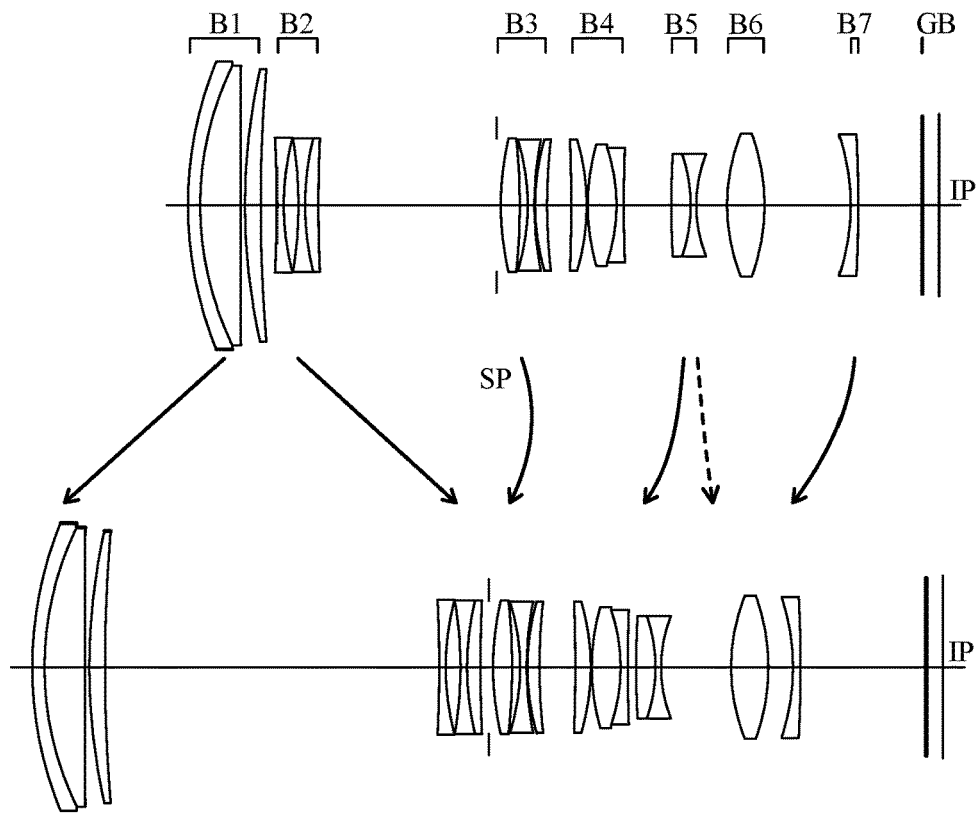
FIG. 1 is a sectional view of a zoom lens according to Example 1.
Figure 2A:
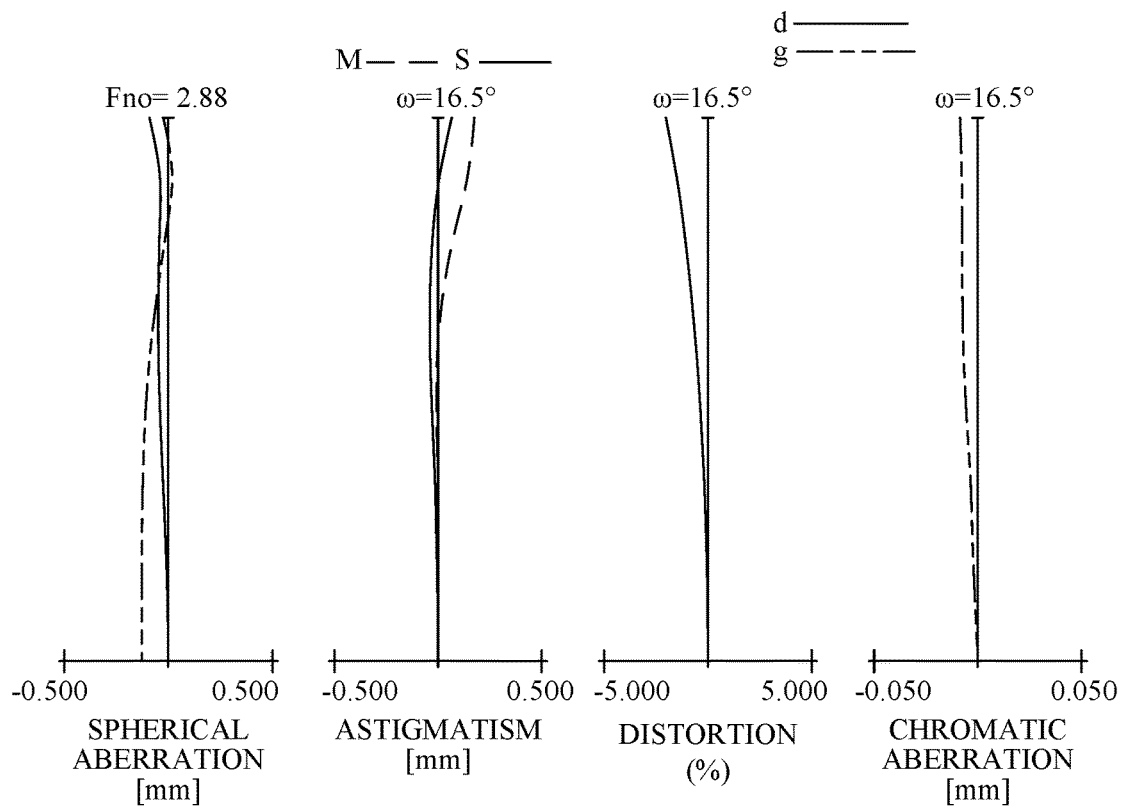
FIGS. 2A to 2C are aberrational diagrams at a wide-angle end (FIG. 2A), a middle zoom position (FIG. 2B), and a telephoto end (FIG. 2C) where the zoom lens according to Example 1 is in focus at infinity.
Figure 2B:
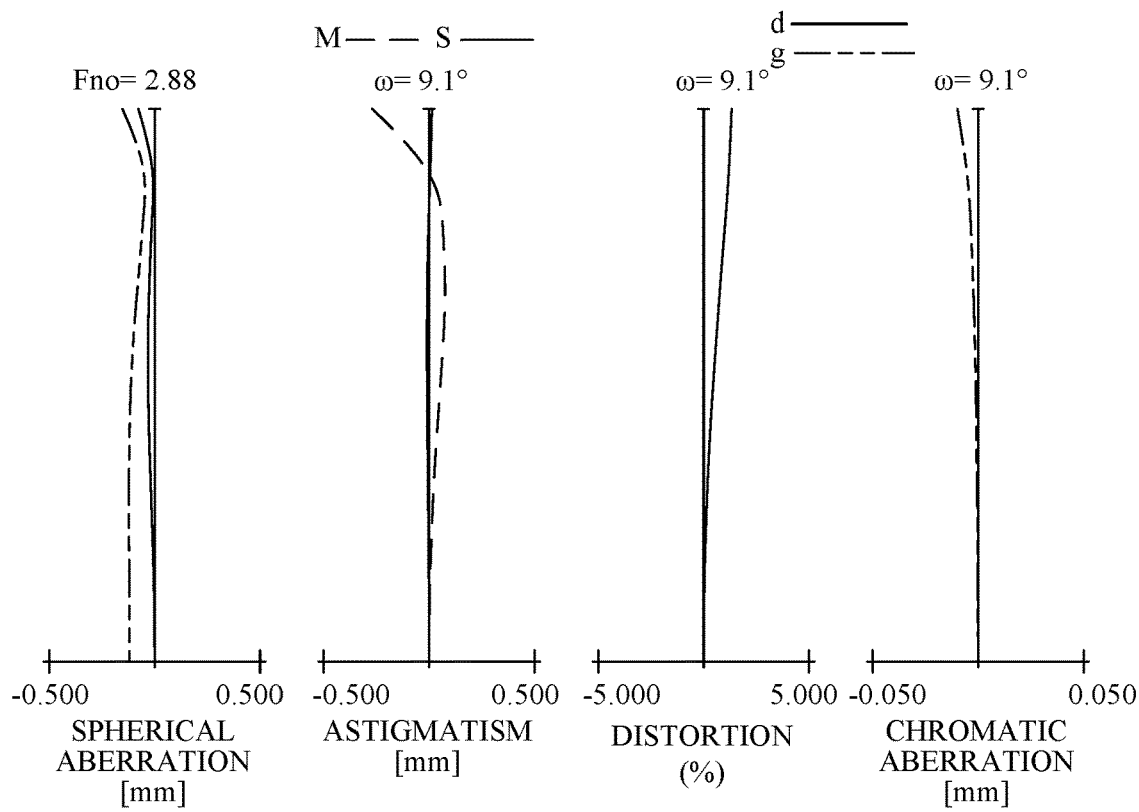
Figure 2C:
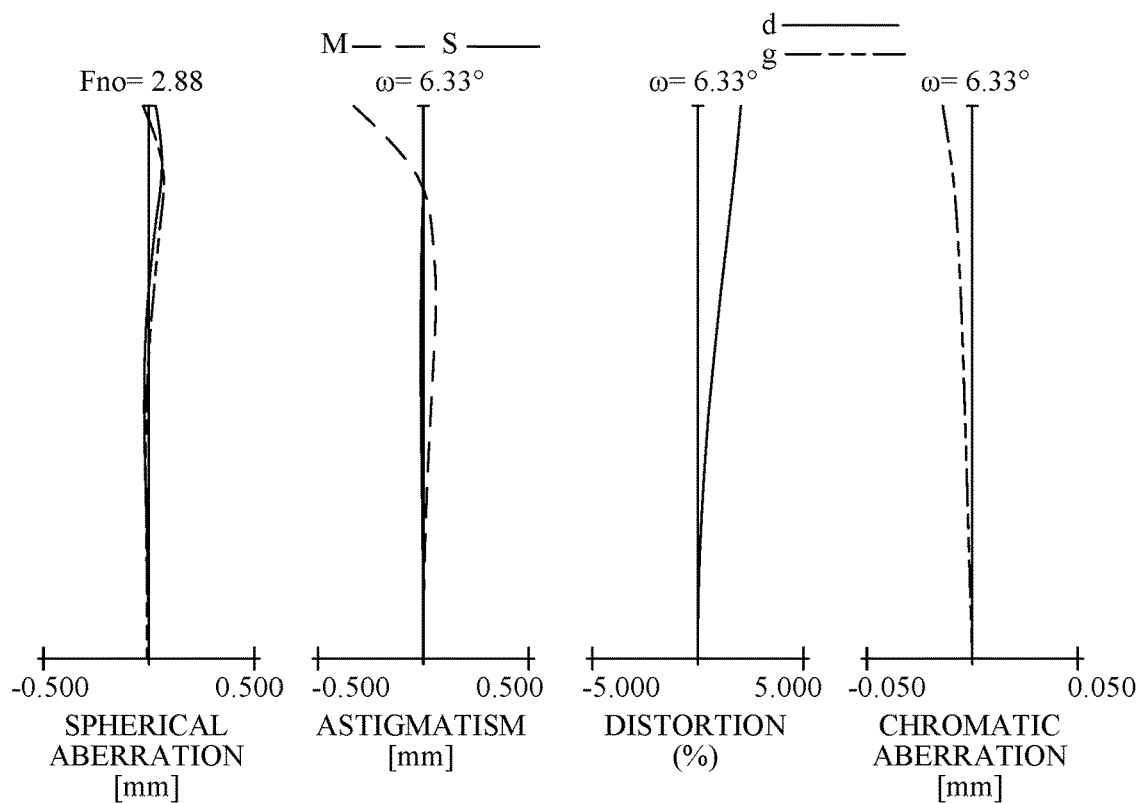
Figure 4B:
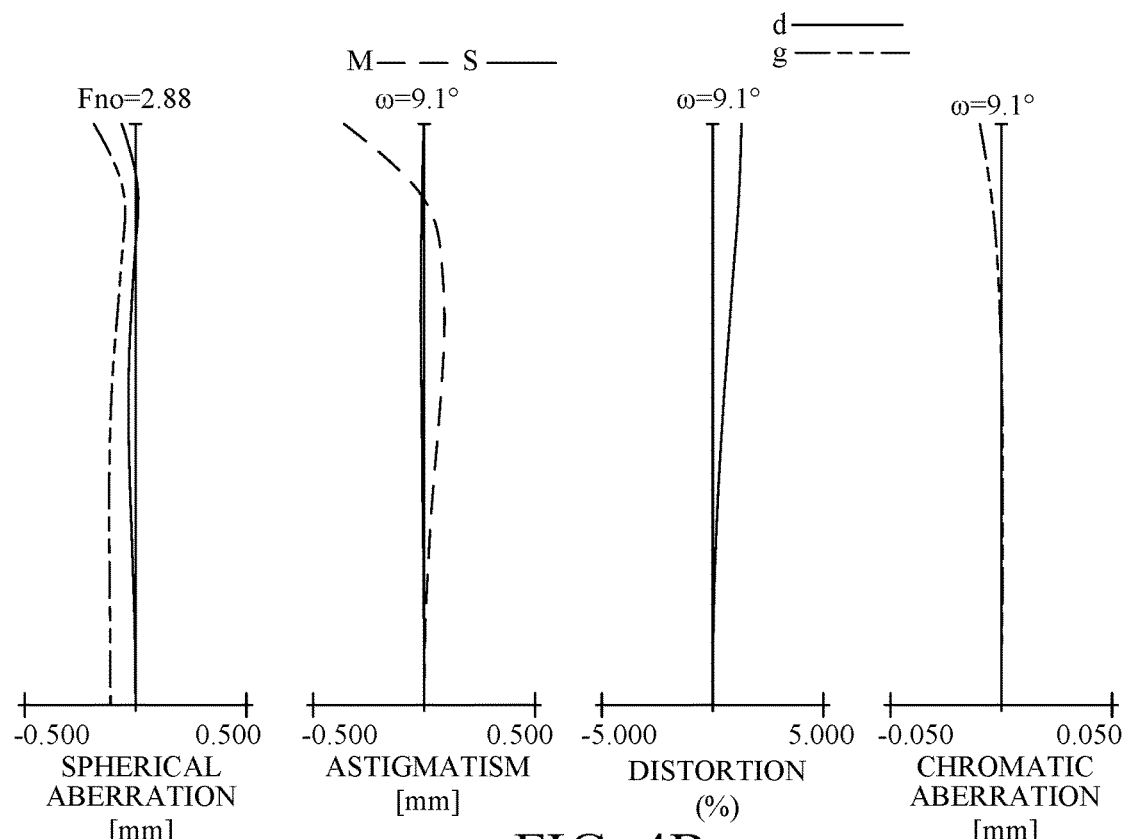
Figure 4C:
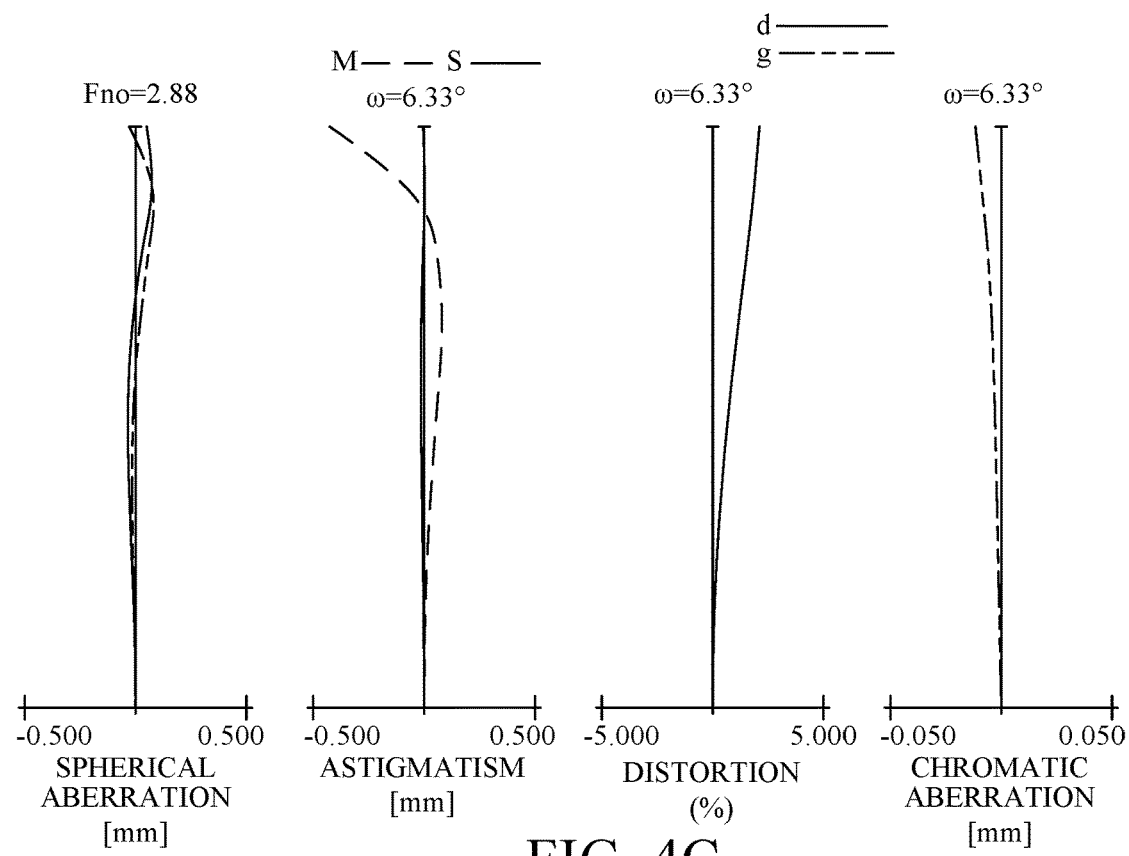

Referring now to the accompanying drawings, a description will be given of examples according to the present invention. A zoom lens according to each example of the present invention includes, in order from an object side to an image side, a first lens unit having a positive refractive power (which is a reciprocal of a focal length), a second lens unit having a negative refractive power, a third lens unit having a positive lens unit, a fourth lens unit having a positive refractive power, a fifth lens unit having a negative refractive power, a sixth lens unit having a positive power, and a seventh lens unit having a negative refractive power. In this zoom lens, during zooming between the wide-angle end and the telephoto end, all or part of the first lens unit and a plurality of lens units among the second to seventh lens units move in the optical axis direction. Further, during zooming, at least one of the fourth to seventh lens units is fixed (or do not move). The lens unit is a group of one or more of lenses in which the distance between front and back lens units changes during zooming or focusing.

FIGS. 1, 3, 5, 7, and 9 illustrate sections of the zoom lenses according to Examples 1 to 5 at the wide-angle end (in the state of the shortest focal length) and the telephoto end (in the state of the longest focal length), respectively. The wide-angle end and the telephoto end refer to states (zoom positions) when the lens unit is mechanically located at both ends of a movable range in the optical axis direction during zooming.

In these figures, the left side is the object side (front side) and the right side is the image side (rear side). When i is an order of a lens unit from the object side to the image side, Bi represents an i lens unit. Subgroups included in the first lens unit B1 will be referred to as a 1A lens unit B1A and a 1B lens unit B1B in order from the object side. Each of the 1A lens unit B1A and the 1B lens unit BIB may have a positive or negative refractive power, as long as they have a positive combined refractive power. During zooming, at least one of the 1A lens unit B1A and the 1B lens unit BIB may move. In Examples 4 and 5 described later, both the 1A lens unit B1A and the 1B lens unit BIB have positive refractive powers, the 1A lens unit B1A moves during zooming, and the 1B lens unit B1B does not move during zooming.

A solid arrow below each lens unit that moves during zooming indicates a movement trajectory of the lens unit during zooming from the wide-angle end to the telephoto end. A dotted arrow below the focus lens unit that moves during focusing indicates its moving trajectory during focusing from an infinity distance to a short distance.

An aperture stop (diaphragm) SP determines a luminous flux of the open F-number (Fno). GB is an optical block corresponding to an optical filter, a face plate, a low-pass filter, an infrared cut filter, and the like. IP is an image plane. Disposed on the image plane IP is an imaging plane of a solid-state image sensor (photoelectric conversion element) such as a CCD sensor and a CMOS sensor, or a film surface of a silver halide film.

In the zoom lens according to Example 1 illustrated in FIG. 1, the entire first lens unit B1 and the second, third, fifth and seventh lens units B2, B3, B5, and B7 move during zooming, and the fourth and sixth lens units B4 and B6 are fixed during zooming. The diaphragm SP is disposed closes to the object in the third lens unit B3.

Various illustrative numerical values of the zoom lens according to Example 1 will be described later as Numerical Example 1. The zoom lens according to Example 1 (Numerical Example 1) is a bright telephoto zoom lens that has a high zoom ratio of 2.6 times, an F-number indicating the brightness of the zoom lens of about 2.88, and a half angle of view w of about 16 to 6 degrees.

In the zoom lens according to Example 2 illustrated in FIG. 3, the entire first lens unit B1 and the second, third, fifth and seventh lens units B2, B3, B5, and B7 move during zooming, and the fourth and sixth lens units B4 and B6 are fixed during zooming. The diaphragm SP is disposed between the second lens unit B2 and the third lens unit B3.

Various illustrative numerical values of the zoom lens according to Example 2 will be described later as Numerical Example 2. The zoom lens according to Example 2 (Numerical Example 2) is a bright telephoto zoom lens that has a high zoom ratio of 2.6 times, an F-number of about 2.88, and a half angle of view of about 16 to 6 degrees.

Figure 5:
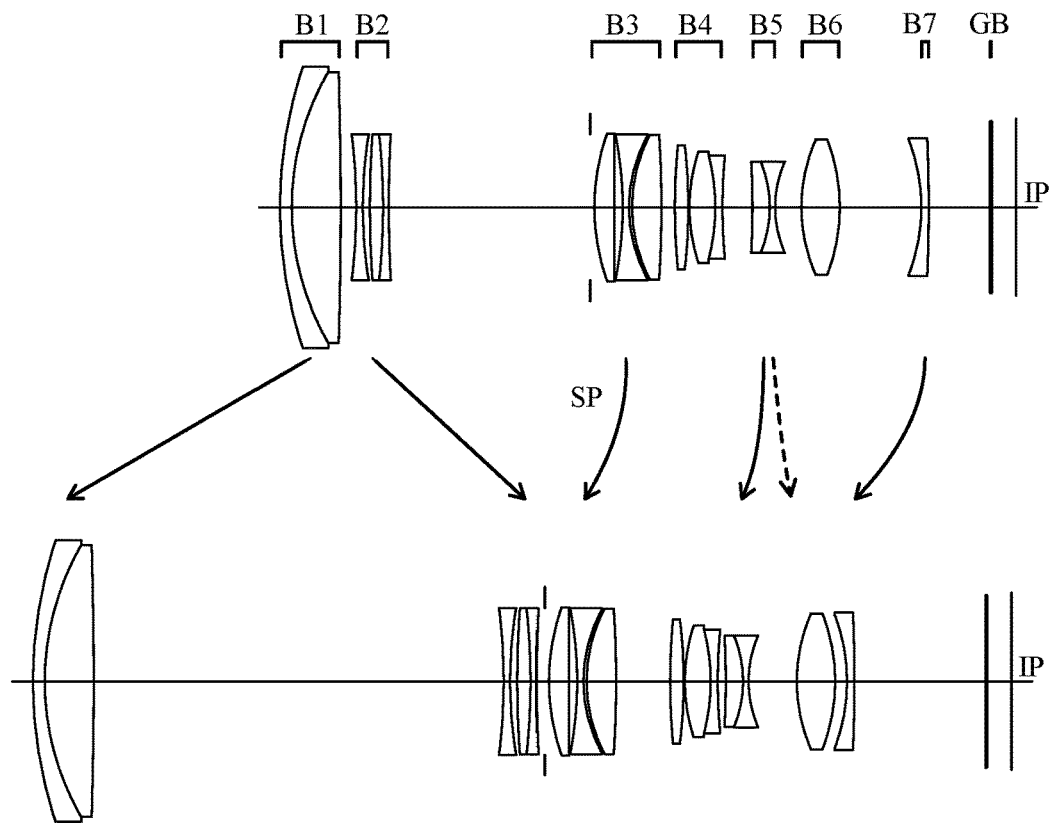
FIG. 5 is a sectional view of a zoom lens according to Example 3.
Figure 6A:
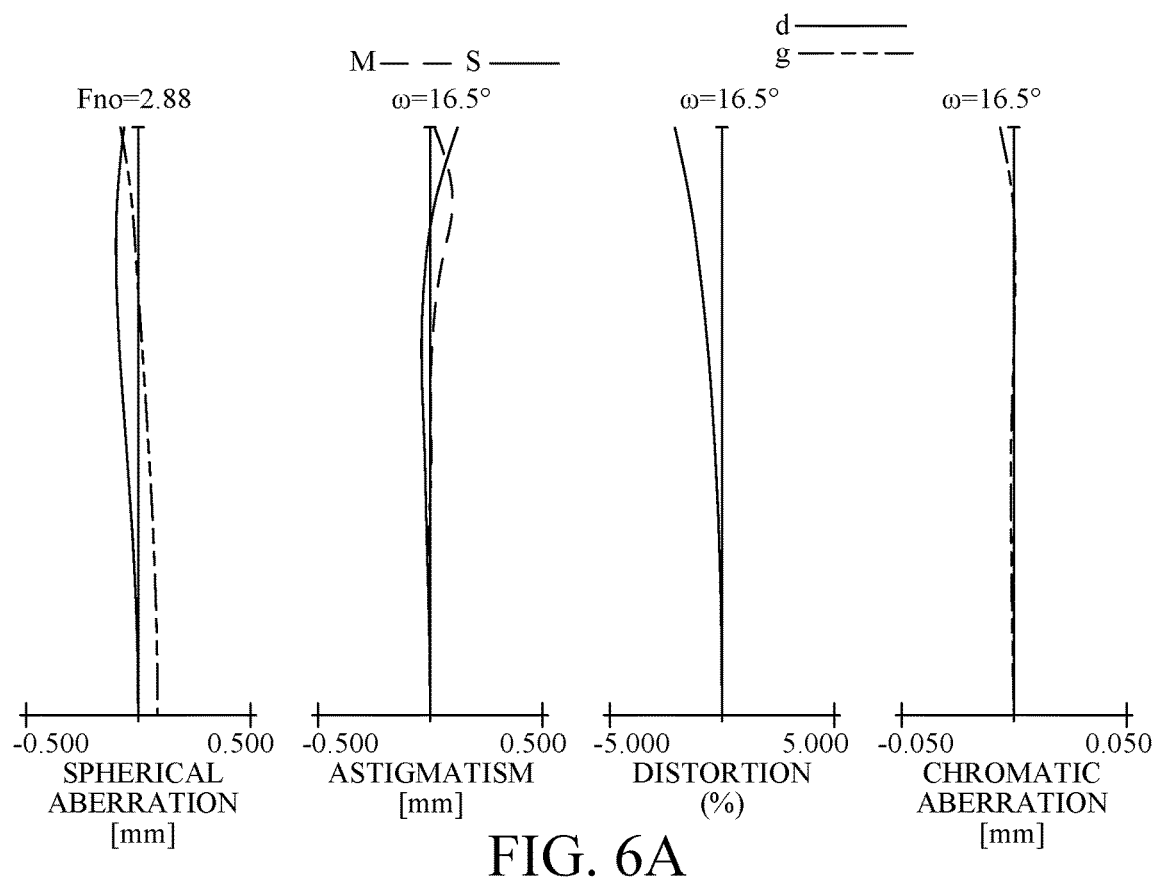
FIGS. 6A to 6C are aberrational diagrams at a wide-angle end (FIG. 6A), a middle zoom position (FIG. 6B), and a telephoto end (FIG. 6C) where the zoom lens according to Example 3 is in focus at infinity.
Figure 6B:
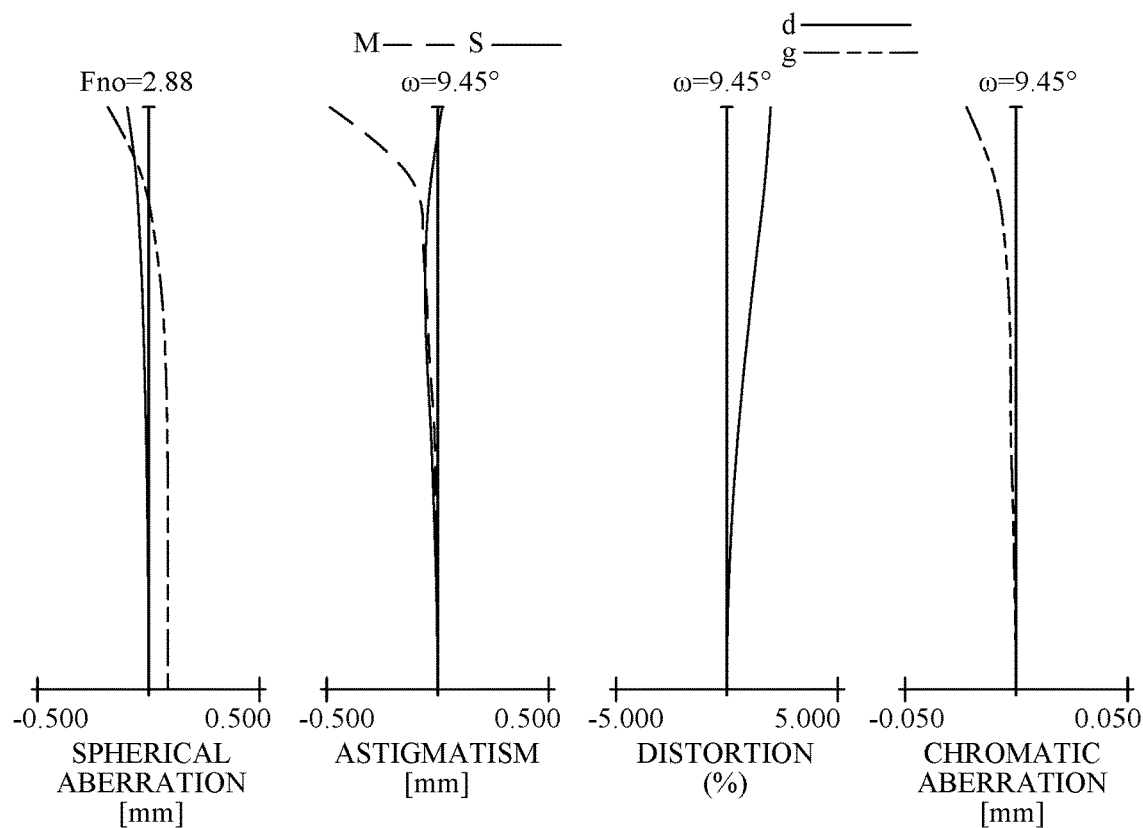
Figure 6C:
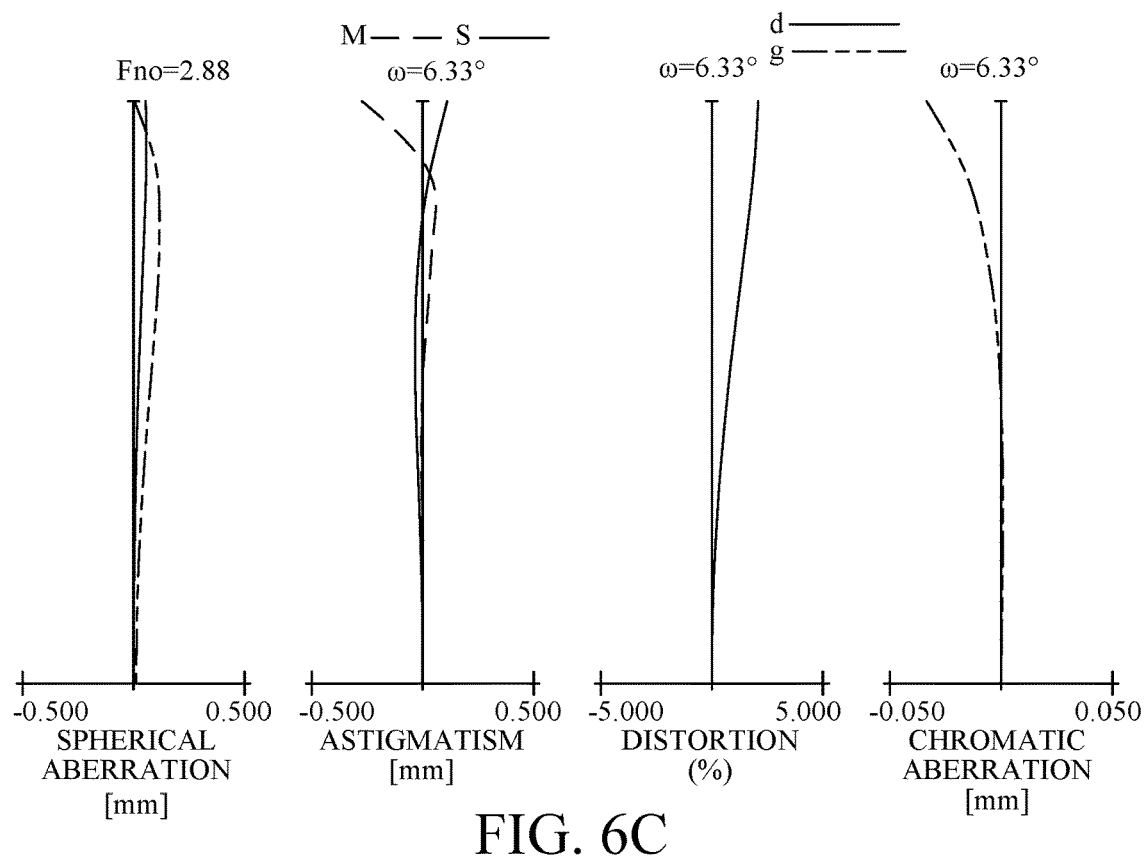

In the zoom lens according to Example 3 illustrated in FIG. 5, the entire first lens unit B1 and the second, third, fifth and seventh lens units B2, B3, B5 and B7 move during zooming, and the fourth and fourth lens units B4 and B9 are fixed during zooming. The diaphragm SP is disposed closes to the object in the third lens unit B3.

Various illustrative numerical values of the zoom lens according to Example 3 will be described later as Numerical Example 3. The zoom lens according to Example 3 (Numerical Example 3) is a bright telephoto zoom lens that has a high zoom ratio of 2.6 times, an F-number of about 2.88, and a half angle of view of about 16 to 6 degrees.

Figure 7:
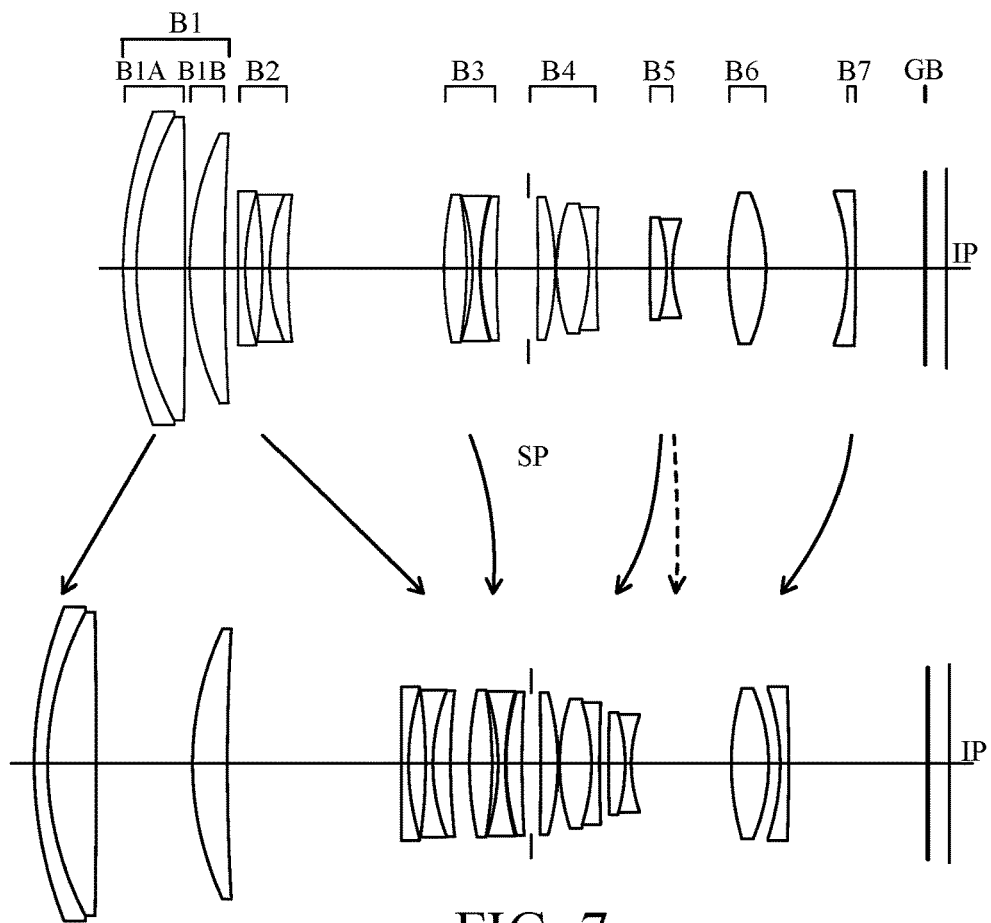
FIG. 7 is a sectional view of a zoom lens according to Example 4.
Figure 8A:
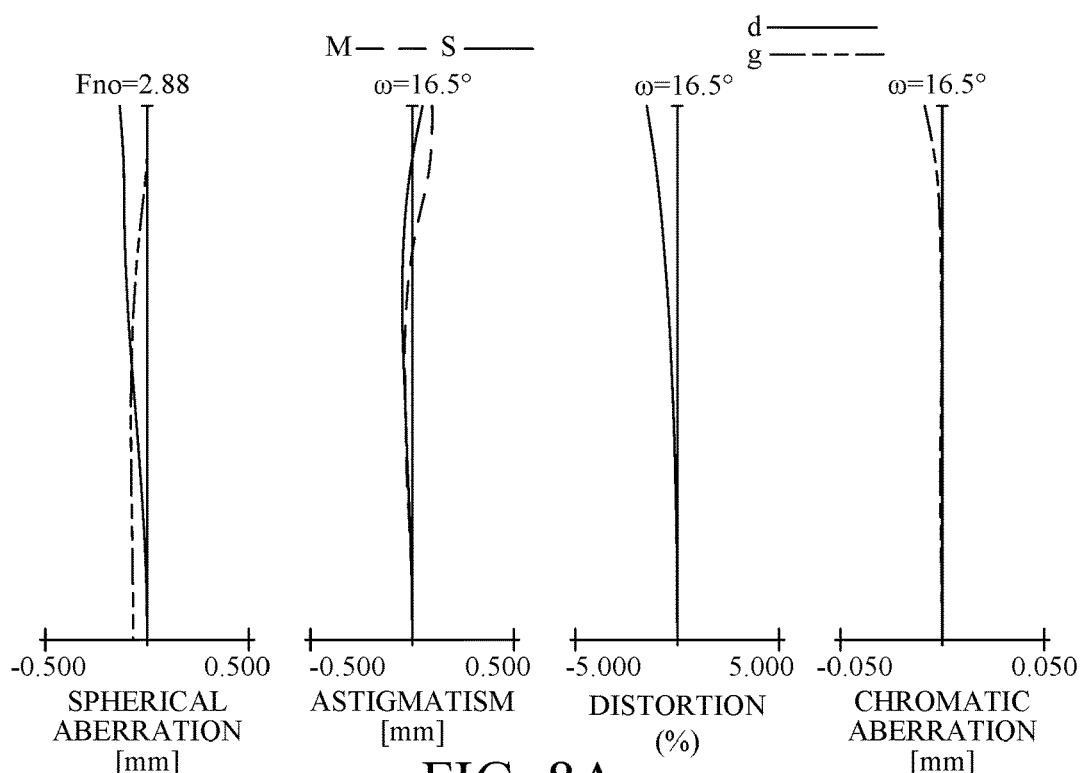
FIGS. 8A to 8C are aberrational diagrams at a wide-angle end (FIG. 8A), a middle zoom position (FIG. 8B), and a telephoto end (FIG. 8C) where the zoom lens according to Example 4 is in focus at infinity.
Figure 8B:
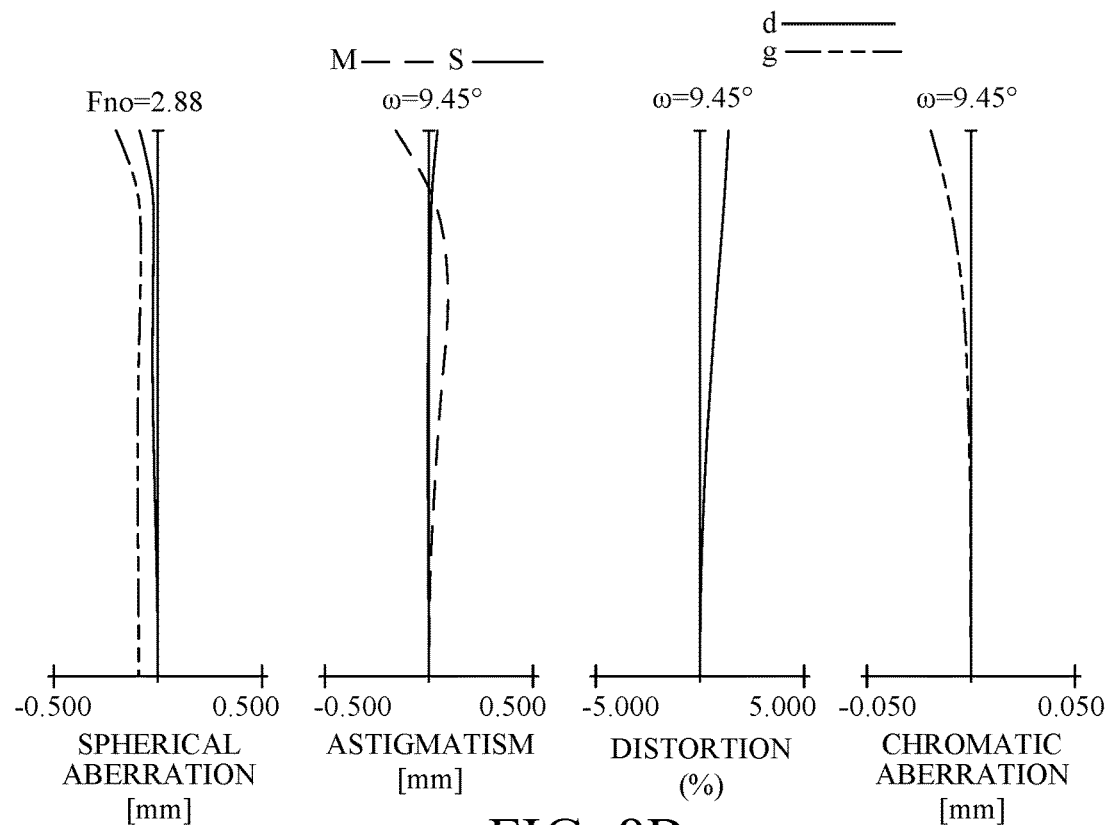
Figure 8C:
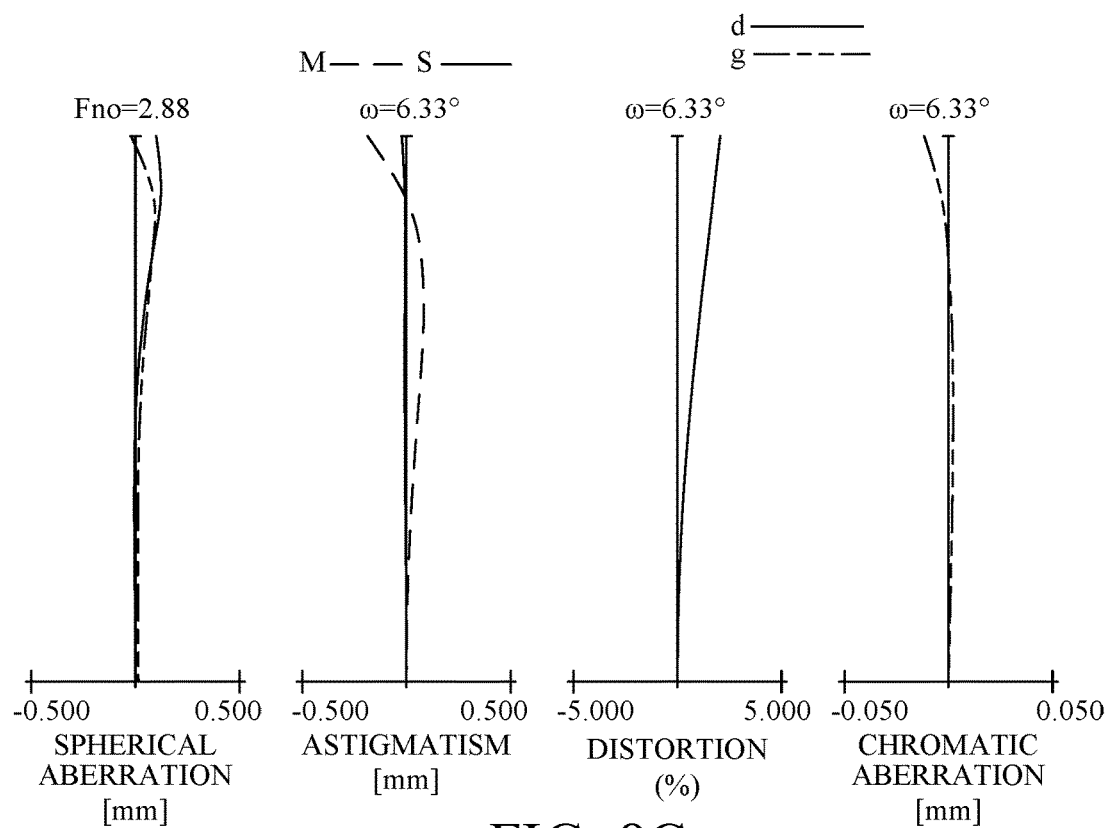

In the zoom lens according to Example 4 illustrated in FIG. 7, the first lens unit B1 includes the 1A lens unit B1A and the 1B lens unit B1B, and the 1A, second, third, fifth, and seventh lens units B1A, B2, B3, B5, and B7 move during zooming. The 1B, fourth, and sixth lens units B1B, B4, and B6 are fixed during zooming. The diaphragm SP is disposed closes to the object in the fourth lens unit B4.

Various illustrative numerical values of the zoom lens according to Example 4 will be described later as Numerical Example 4. The zoom lens according to Example 4 (Numerical Example 4) is a bright telephoto zoom lens that has a high zoom ratio of 2.6 times, an F-number of about 2.88, and a half angle of view of about 16 to 6 degrees.

Figure 9:
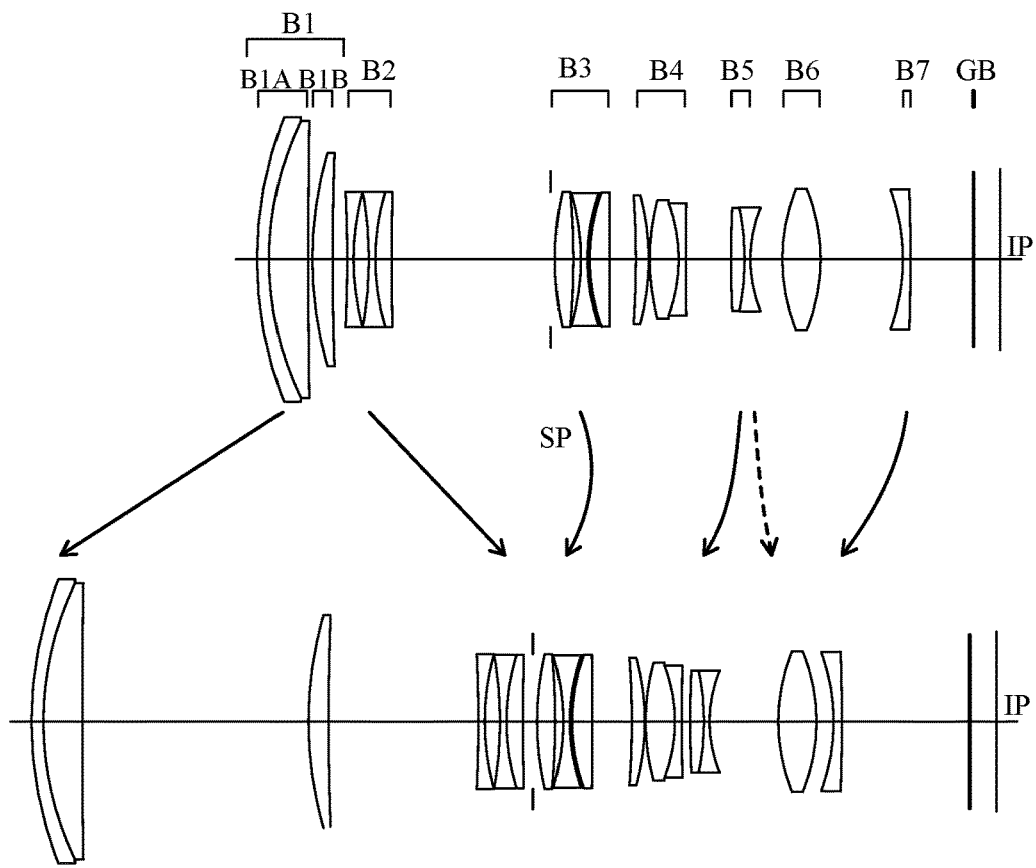
FIG. 9 is a sectional view of the zoom lens according to Example 5.
Figure 10A:
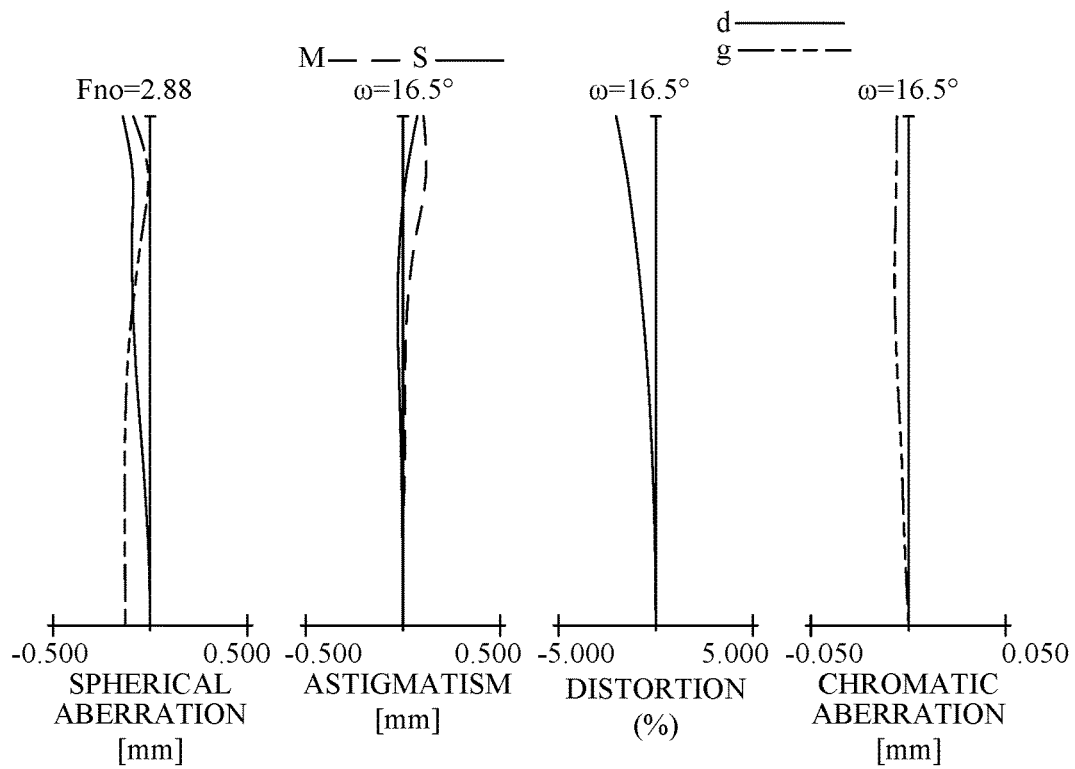
FIGS. 10A to 10C are aberrational diagrams at a wide-angle end (FIG. 10A), a middle zoom position (FIG. 10B), and a telephoto end (FIG. 10C) where the zoom lens according to Example 5 is in focus at infinity.
Figure 10B:
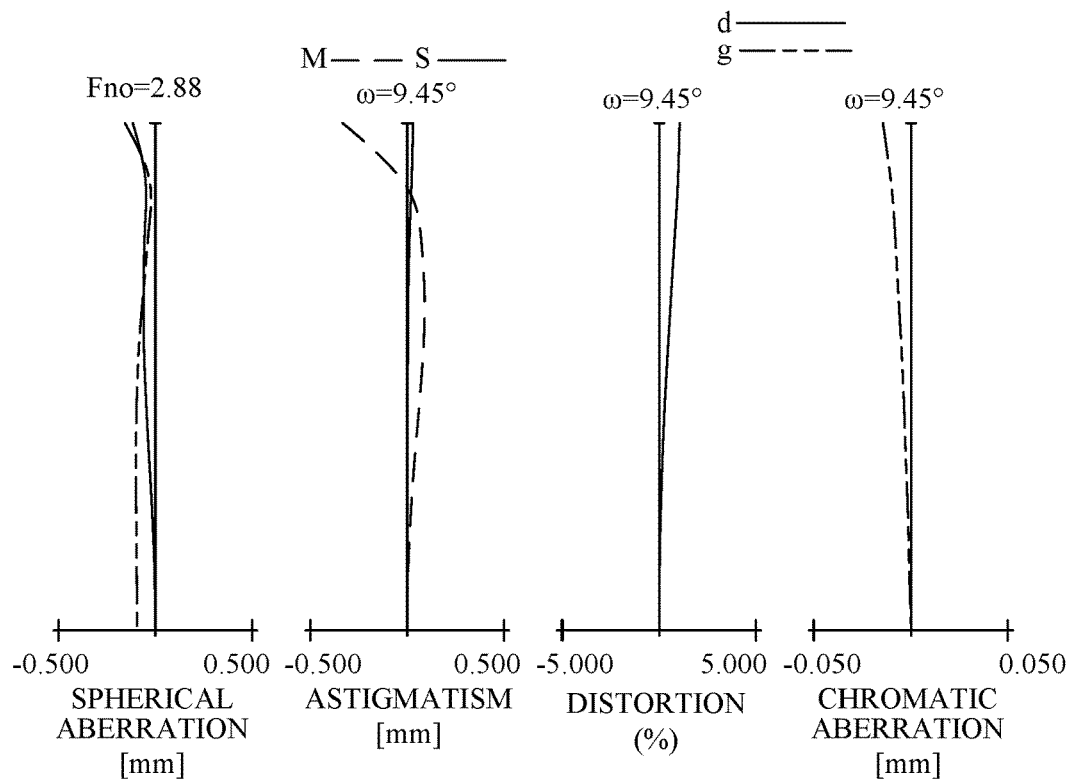
Figure 10C:
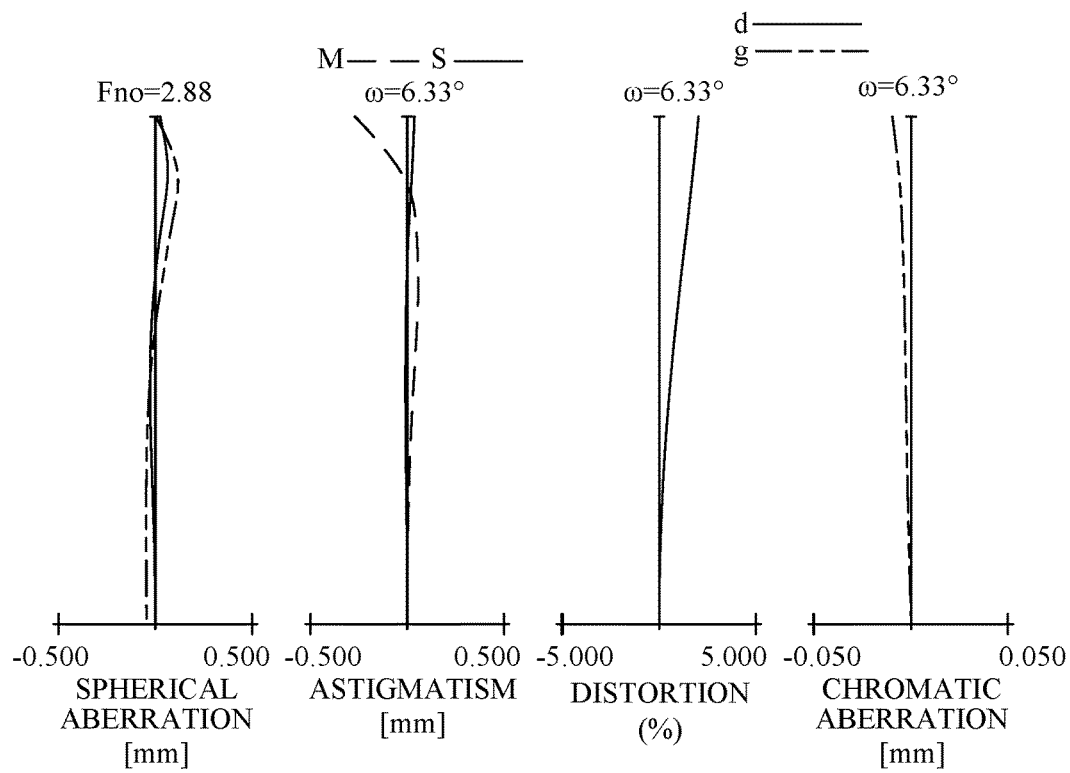

In the zoom lens according to Example 5 illustrated in FIG. 9, the first lens unit B1 includes the 1A lens unit B1A and the 1B lens unit B1B, and the 1A, second, third, fifth, and seventh lens units B1A, B2, B3, B5, and B7 move during zooming. The 1B, fourth, and sixth lens units B1B, B4, and B6 are fixed during zooming. The diaphragm SP is disposed closest to the object in the third lens unit B3.

Various illustrative numerical values of the zoom lens according to Example 5 will be described later as Numerical Example 5. The zoom lens according to Example 5 (Numerical Example 5) is a bright telephoto zoom lens that has a high zoom ratio of 2.6 times, an F-number of about 2.88, and a half angle of view of about 16 to 6 degrees.

The zoom lens according to each example is used as an imaging optical system in an image pickup apparatus such as a video camera, a digital still camera, a film-based camera, and a TV camera, but may be used as a projection optical system in an image projection apparatus (projector) that includes an optical modulation element such as a liquid crystal panel or a digital micromirror device. In this case, in the sectional view of the zoom lens, the left side is the object side (projection surface side) and the right side is the image side (light modulation element side).

FIGS. 2A to 2C, 4A to 4C, 6A to 6C, 8A to 8C, and 10A to 10C are aberrational diagrams at the wide-angle end (FIGS. 2A, 4A, 6A, 8A, and 10A), middle zoom position (FIGS. 2B, 4B, 6B, 8B, and 10B), and the telephoto end (FIGS. 2C, 4C, 6C, 8C, and 10C) of the zoom lenses according to Examples 1 to 5 that are in-focus at infinity.

In a spherical aberration diagram, Fno represents an F-number, a solid line represents a spherical aberration for the d-line (wavelength 587.6 nm), and an alternate long and two short dashes line represents a spherical aberration for the g-line (wavelength 435.8 nm). In an astigmatism diagram, a solid line S represents a sagittal image plane, and a broken line M indicates a meridional image plane. A distortion illustrates that for the d-line. A chromatic aberration diagram illustrates a lateral chromatic aberration for the g-line. ω is a half angle of view (°).

Generally, a zoom lens that includes, in order from the object side to the image side, a first lens unit having a positive refractive power, a second lens unit having a strong negative refractive power, a third lens unit having a positive refractive power, and a plurality of subsequent lens units, is compact and likely to have a high zoom ratio. The zoom lens according to each example includes, as the subsequent lens unit, the fourth lens unit B4 having a positive refractive power, the fifth lens unit B5 having a negative refractive power, the sixth lens unit B6 having a positive refractive power, and the seventh lens unit B7 having a negative refractive power in this order from the object side to the image side, thereby provides a bright F-number and suppresses various aberrations in addition to a small size and a high zoom ratio.

Compared with a conventional zoom lens, the zoom lens according to each example shortens the overall lens length at the wide-angle end by moving all or part of the first lens unit B1 to the object side during zooming from the wide-angle end to the telephoto end. Moving a plurality of lens units among the second to seventh lens units B2 to B7 in the optical axis direction can provide a high zoom ratio while suppressing fluctuations in various aberrations. At this time, since at least one lens unit among the fourth to seventh lens units B4 to B7 is fixed, the configuration of the driving mechanism for moving the lens unit(s) during zooming can be made simple, and the optical apparatus having the zoom lens can be made compact. In each example, at least the fourth and sixth lens units B4 and B6 are fixed during zooming.

In the zoom lens according to each example, the negative fifth lens unit B5 is moved during focusing. Since the fifth lens unit B5 is a lens unit having a smaller diameter among the first to seventh lens units B1 to B7, the driving mechanism of the fifth lens unit B5 can be made compact for focusing.

In the zoom lens according to each example, the third lens unit B3 and the fourth lens unit B4 include two positive lenses and one negative lens, respectively. Since the third lens unit B3 and the fourth lens unit B4 are lens units having large axial ray diameters among the first to seventh lens units B1 to B7, a plurality of lenses may be used to correct the spherical aberration and longitudinal chromatic aberration. In addition, only one of the third lens unit B3 and the fourth lens unit B4 may include two positive lenses and one negative lens.

The zoom lens according to each example may satisfy the following conditional expression (1):

$$1.440 \le f1/|f2| \le 3.260 \tag{1}$$

where f1 is a focal length of the first positive lens unit B1 (or the combined focal length of the 1A and 1B lens units), and f2 is a focal length of the negative second lens unit B2.

The conditional expression (1) shows a condition on a ratio of the focal length of the first lens unit B1 (1A and 1B lens units B1A and B1B) to the absolute value of the focal length of the second lens unit B2. If the focal length of the first lens unit B1 becomes too large so that f1/|f2| is higher than the upper limit in the conditional expression (1), the aberration can be easily corrected, but a moving amount of the first lens unit B1 (or 1A lens unit B1A) during zooming becomes large and the zoom lens becomes large. If the focal length of the first lens unit B1 becomes too small so that f1/|f2| is lower than the lower limit in the conditional equation (1), it is effective for miniaturizing the zoom lens, but it becomes difficult to correct the spherical aberration particularly at the telephoto end.

The zoom lens according to each example may further satisfy the following conditional expression (2):

$$1.690 \le |f2|/wsk \le 5.990 \tag{2}$$

where f2 is a focal length of the second negative lens unit B2, and wsk is a backfocus of the zoom lens at the wide-angle end.

The conditional expression (2) shows a condition on a ratio of the absolute value of the focal length of the second lens unit B2 to the backfocus at the wide-angle end. If the absolute value of the focal length of the second lens B2 becomes too large so that |f2|/wsk is higher than the upper limit in the conditional expression (2), the aberration can be easily corrected, but a moving amount of the second lens unit B2 during zooming becomes large and the zoom lens becomes large. If the absolute value of the focal length of the second lens unit B2 becomes too small so that |f2|/wsk is lower than the lower limit in the conditional expression (2), it is effective for miniaturizing the zoom lens, but it becomes difficult to correct the curvature of field and distortion particularly at the wide-angle end.

The zoom lens according to each example may further satisfy the following conditional expression (3):

$$0.440 \le f3/f4 \le 4.350 \tag{3}$$

where f3 is a focal length of the third positive lens unit B2, and f4 is a focal length of the fourth positive lens unit B4.

The conditional expression (3) shows a condition on a ratio of the focal length of the third lens unit B3 to the focal length of the fourth lens unit B4. If the focal length of the third lens unit B3 becomes too large so that f3/f4 is higher than the upper limit in the conditional expression (3), the aberration can be easily corrected, but a moving amount of the third lens unit B3 during zooming becomes large and the zoom lens becomes large. If the focal length of the third lens unit B3 becomes too small so that f3/f4 is lower than the lower limit in the conditional equation (3), it is effective for miniaturizing the zoom lens, but it becomes difficult to correct the spherical aberration and the longitudinal chromatic aberration particularly at the telephoto end.

The zoom lens according to each example may further satisfy the following conditional expression (4):

$$1.8505 \le f1/|f5| \le 9.230 \tag{4}$$

where f1 is a focal length of the first positive lens unit B1 (or a combined focal length of the 1A and 1B lens units B1A and B1B), and f5 is a focal length of the fifth negative lens unit B5.

The conditional expression (4) shows a condition on a ratio of the focal length of the first lens unit B1 (the 1A and 1B lens units B1A and B1B) to an absolute value of the focal length of the fifth lens unit B5. If the absolute value of the focal length of the fifth lens unit B5 becomes too large so that f1/f3 is higher than the upper limit in the conditional expression (4), it becomes easy to correct the aberration, but a moving amount of the fifth lens unit B5 during focusing becomes large and the zoom lens becomes large. If the absolute value of the focal length of the fifth lens unit B5 becomes too small so that f1/f5 is lower than the lower limit in the conditional expression (4), it is effective for miniaturizing the zoom lens, but it becomes difficult to correct the spherical aberration and the curvature of field during focusing on a short distance.

The zoom lens according to each example may further satisfy the following conditional expression (5):

$$0.340 \le f6/|f7| \le 0.900 \tag{5}$$

where f6 is a focal length of the sixth positive lens unit B6 and f7 is a focal length of the seventh negative lens unit B7.

The conditional expression (5) shows a condition on a ratio of the focal length of the sixth lens unit B6 to an absolute value of the focal length of the seventh lens unit B7. If the absolute value of the focal length of the seventh lens unit B7 becomes too large so that f6/|f7| is higher than the upper limit in the conditional expression (5), the aberration can be easily corrected, but a moving amount of the seventh lens unit B7 during zooming becomes large and the zoom lens becomes large. If the absolute value of the focal length of the seventh lens unit B7 becomes too small so that f6/|f7| is lower than the lower limit in the conditional expression (5), it is effective for miniaturizing the zoom lens, but it becomes difficult to correct the fluctuation of the curvature of field during zooming.

The zoom lens according to each example may further satisfy the following conditional expression (6):

$$0.590 \leq f1/f3 \leq 4.110 \quad (6)$$

where f1 is a focal length of the first positive lens unit B1 (or a combined focal length of the 1A and 1B lens units B1A and B1B), and f3 is a focal length of the third positive lens unit B3.

The conditional expression (6) shows a condition on a ratio of the focal length of the first lens unit B1 (1A and 1B lens units B1A and B1B) to the focal length of the third lens unit B3. If the focal length of the first lens unit B1 becomes too large so that f1/f3 is higher than the upper limit in the conditional expression (6), the aberration can be easily corrected, but a moving amount of the first lens unit B1 during zooming becomes large and the zoom lens becomes large. If the focal length of the first lens unit B1 becomes too small so that f1/f3 is lower than the lower limit in the conditional equation (6), it is effective for miniaturizing the zoom lens, but it becomes difficult to correct the spherical aberration and the longitudinal chromatic aberration particularly at the telephoto end.

The zoom lens according to each example may further satisfy the following conditional expression (7):

$$1.150 \leq f1/|f7| \leq 3.460 \quad (7)$$

where f1 is a focal length of the first positive lens unit B1 (or a combined focal length of the 1A and 1B lens units B1A and B1B), and f7 is a focal length of the seventh negative lens unit B7.

The conditional expression (7) shows a condition on a ratio of the focal length of the first lens unit B1 (1A and 1B lens units B1A and B1B) to an absolute value of the focal length of the seventh lens unit B7. If the absolute value of the focal length of the seventh lens unit B7 becomes too large so that f1/|f7| is higher than the upper limit in the conditional expression (7), the aberration can be easily corrected, but a moving amount of the seventh lens unit B7 during zooming becomes large and the zoom lens becomes large. If the absolute value of the focal length of the seventh lens unit B7 becomes too small so that f1/|f7| is lower than the lower limit in the conditional expression (7), it is effective for miniaturizing the zoom lens, but it becomes difficult to correct the fluctuation of the curvature of field during zooming.

The zoom lens according to each example may further satisfy the following conditional expression (8):

$$0.720 \leq |f2|/f6 \leq 2.780 \quad (8)$$

where f2 is a focal length of the second negative lens unit B2, and f6 is a focal length of the sixth positive lens unit B6.

The conditional expression (8) shows a condition on a ratio of an absolute value of the focal length of the second lens unit B2 and the focal length of the sixth lens unit B6. If the absolute value of the focal length of the second lens unit B2 becomes too large so that |f2|/f6 is higher than the upper limit in the conditional expression (8), the aberration can be easily corrected, but a moving amount of the second lens unit B2 during zooming becomes large and the zoom lens becomes large. If the absolute value of the focal length of the second lens unit B2 becomes too small so that |f2|/f6 is lower than the lower limit in the conditional expression (8), it is effective for miniaturization, but it becomes difficult to correct the fluctuation of the curvature of field particularly at the wide-angle end.

The zoom lens according to each example may further satisfy the following conditional expression (9):

$$2.370 \leq |f7|/wsk \leq 5.650 \quad (9)$$

where f7 is a focal length of the seventh negative lens unit B7, and wsk is a backfocus at the wide-angle end.

The conditional expression (9) shows a condition on a ratio of an absolute value of the focal length of the seventh lens unit B7 to the backfocus at the wide-angle end. If the absolute value of the focal length of the seventh lens unit B7 becomes too large so that |f7|/wsk is higher than the upper limit in the conditional expression (9), the aberration can be easily corrected, but a moving amount of the seventh lens unit B7 during zooming becomes large and the zoom lens becomes large. If the absolute value of the focal length of the seventh lens unit B7 becomes too small so that |f7|/wsk is lower than the lower limit in the conditional expression (9), it is effective for miniaturization, but it becomes difficult to correct the fluctuation of the curvature of field particularly at the wide-angle end.

The zoom lens according to each example may further satisfy the following conditional expression (10).

$$0.550 \leq f3/|f2| \leq 3.560 \quad (10)$$

where f3 is a focal length of the third positive lens unit B3, and f2 is a focal length of the second negative lens unit B2.

The conditional expression (10) shows a condition on a ratio of the focal length of the third lens unit B3 to an absolute value of the focal length of the second lens unit B2. If the focal length of the third lens unit B3 becomes too large so that f3/|f2| is higher than the upper limit in the conditional expression (10), a moving amount of the third lens unit B3 during zooming becomes large and the zoom lens becomes large. If the focal length of the third lens unit B3 becomes too small so that f3/|f2| is lower than the lower limit in the conditional equation (10), it is effective for miniaturizing the zoom lens, but it becomes difficult to correct the spherical aberration particularly at the telephoto end.

The zoom lens according to each example may further satisfy the following conditional expression (11):

$$0.430 \leq |f2|/fw \leq 1.640 \quad (11)$$

where f2 is a focal length of the second negative lens unit B2, and fw is a focal length of the entire zoom lens system at the wide-angle end.

The conditional expression (11) shows a condition on a ratio of an absolute value of the focal length of the second lens unit B2 to the focal length of the entire system at the wide-angle end. If the absolute value of the focal length of the second lens unit B2 becomes too large so that |f2|/fw is higher than the upper limit in the conditional expression (11), the aberration can be easily corrected, but a moving amount of the second lens unit B2 during zooming becomes large and the zoom lens becomes large. If the absolute value of the focal length of the second lens unit B2 becomes too small so that |f2|/fw is lower than the lower limit in the conditional expression (11), it is effective for miniaturizing the zoom lens, but it becomes difficult to correct the spherical aberration particularly at the wide-angle end.

The zoom lens according to each example may further satisfy the following conditional expression (12):

$$0.110 \leq |f5|/ft \leq 0.310 \quad (12)$$

where f5 is a focal length of the fifth negative lens unit B5, and ft is a focal length of the entire zoom lens system at the telephoto end.

The conditional expression (12) shows a condition on a ratio of an absolute value of the focal length of the fifth lens unit B5 to the focal length of the entire system at the telephoto end. If the absolute value of the focal length of the fifth lens unit B5 becomes too large so that |f5|/ft is higher than the upper limit in the conditional expression (12), the aberration can be easily corrected, but a moving amount of the fifth lens unit B5 during focusing becomes large and the zoom lens becomes large. If the absolute value of the focal length of the fifth lens unit B5 becomes too small so that |f5|/ft is lower than the lower limit in the conditional expression (12), it is effective for miniaturizing the zoom lens, but it becomes difficult to correct the fluctuation of the curvature of field particularly at the wide-angle end.

The zoom lens according to each example may further satisfy the following conditional expression (13):

$$0.150 \leq f6/ft \leq 0.320 \tag{13}$$

where f6 is a focal length of the sixth positive lens unit B6, and ft is a focal length of the entire zoom lens system at the telephoto end.

The conditional expression (13) shows a condition on a ratio of the focal length of the sixth lens unit B6 to the focal length of the entire system at the telephoto end. If the focal length of the sixth lens unit B6 becomes too large so that f6/ft is higher than the upper limit in the conditional expression (13), it becomes difficult to mainly correct the lateral chromatic aberration. If the focal length of the sixth lens unit B6 becomes too small so that f6/ft is lower than the lower limit in the conditional expression (13), it is effective for miniaturizing the zoom lens, but it becomes difficult to correct the fluctuation of the curvature of field particularly at the wide-angle end.

Satisfying any of the above conditional expressions can provide a compact telephoto zoom lens having a high zoom ratio, a good optical performance over the entire zoom range, and a bright F-number. In the zoom lens according to each example, all the lens units include only spherical lenses, and do not have any aspherical lenses, which are expensive to manufacture.

The numerical range of the conditional expressions (1) to (13) may be set as follows:

$$1.850 \leq f1/|f2| \leq 2.760 \tag{1a}$$

$$2.170 \leq |f2|/wsk \leq 5.070 \tag{2a}$$

$$0.570 \leq f3/f4 \leq 3.680 \tag{3a}$$

$$2.3705 \leq f1/|f5| \leq 7.810 \tag{4a}$$

$$0.440 \leq f6/|f7| \leq 0.760 \tag{5a}$$

$$0.760 \leq f1/f3 \leq 3.480 \tag{6a}$$

$$1.480 \leq f1/|f7| \leq 2.930 \tag{7a}$$

$$0.930 \leq |f2|/f6 \leq 2.350 \tag{8a}$$

$$3.050 \leq |f7|/wsk \leq 4.780 \tag{9a}$$

$$0.710 \leq f3/|f2| \leq 3.010 \tag{10a}$$

$$0.5505 \leq |f2|/fw \leq 1.390 \tag{11a}$$

$$0.140 \leq |f5|/ft \leq 0.260 \tag{12a}$$

$$0.190 \leq f6/ft \leq 0.270 \tag{13a}$$

The numerical range of the conditional expressions (1) to (13) may be set as follows:

$$2.003 \leq f1/|f2| \leq 2.580 \tag{1b}$$

$$2.344 \leq |f2|/wsk \leq 4.744 \tag{2b}$$

$$0.615 \leq f3/f4 \leq 3.443 \tag{3b}$$

$$2.563 \leq f1/|f5| \leq 7.312 \tag{4b}$$

$$0.480 \leq f6/|f7| \leq 0.708 \tag{5b}$$

$$0.820 \leq f1/f3 \leq 3.252 \tag{6b}$$

$$1.597 \leq f1/|f7| \leq 2.735 \tag{7b}$$

$$1.006 \leq |f2|/f6 \leq 2.200 \tag{8b}$$

$$3.2901 \leq |f7|/wsk \leq 4.474 \tag{9b}$$

$$0.770 \leq f3/|f2| \leq 2.818 \tag{10b}$$

$$0.600 \leq |f2|/fw \leq 1.296 \tag{11b}$$

$$0.160 \leq |f5|/ft \leq 0.242 \tag{12b}$$

$$0.213 \leq f6/ft \leq 0.250 \tag{13b}$$

Although the zoom lens includes seven lens units in Examples 1 to 5, the zoom lens may include eight or more lens units and satisfy the above conditional expression(s).

Numerical examples 1 to 5 will be shown below. In each numerical example, ri represents a radius of curvature (mm) of an i surface counted from the object side, di represents a lens thickness or air spacing (mm) between i and (i+1) surfaces, and ndi represents a refractive index of a material of the i optical element for the d-line. Two surfaces closest to the image plane correspond to a glass block G.

vdi represents an Abbe number of the material of the i optical element based on the d-line. The Abbe number vd is expressed as vd=(Nd−I)/(NF−NC) where Nd, NF, and NC are refractive indexes for the d-line (587.6 nm), F-line (486.1 nm), and C-line (656.3 nm) in the Fraunhofer line.

sk represents a backfocus (mm). The "backfocus" refers to a distance on the optical axis from the final surface of the zoom lens (closest to the image plane) to a paraxial image plane in terms of the air equivalent length. The "overall lens length" is a length obtained by adding the backfocus to the distance on the optical axis from the frontmost surface (closest to the object) to the final surface (closest to the image plane) in the zoom lens. wsk in the conditional expressions (2) and (9) represents sk at the wide-angle end.

fi represents a focal length of the i lens unit. "Wide-angle" represents a wide-angle end, "middle" represents a middle zoom position, and "telephoto" represents a telephoto end. When the first lens unit includes subgroups of the 1A lens unit and the 1B lens unit, f1 represents a combined focal length of the 1A lens unit and the 1B lens unit at the wide-angle end.

Table 1 summarizes values corresponding to the conditional expressions (1) to (13) in Examples (Numerical Examples) 1 to 5.

Numerical Example 1

UNIT: mm

Surface Data

| Surface No. | r | d | nd | vd |
|---|---|---|---|---|
| 1 | 90.003 | 2.90 | 1.96300 | 24.1 |
| 2 | 75.417 | 9.65 | 1.43875 | 94.7 |
| 3 | 10149.843 | 1.00 | | |
| 4 | 146.037 | 3.75 | 1.49700 | 81.5 |
| 5 | 381.317 | (Variable) | | |
| 6 | −301.093 | 1.50 | 1.54814 | 45.8 |
| 7 | 61.756 | 3.57 | | |
| 8 | −89.325 | 1.50 | 1.56883 | 56.4 |
| 9 | 64.995 | 3.19 | 2.00069 | 25.5 |
| 10 | 330.239 | (Variable) | | |
| 11 (Diaphragm) | ∞ | 1.00 | | |
| 12 | 68.358 | 4.58 | 1.88300 | 40.8 |
| 13 | −142.212 | 1.89 | | |
| 14 | −51.004 | 1.50 | 1.72825 | 28.5 |
| 15 | 76.339 | 0.20 | | |
| 16 | 55.898 | 2.83 | 1.88300 | 40.8 |
| 17 | 127.283 | (Variable) | | |
| 18 | −430.797 | 3.72 | 2.00330 | 28.3 |
| 19 | −54.144 | 0.20 | | |
| 20 | 51.607 | 6.89 | 1.59522 | 67.7 |
| 21 | −42.119 | 1.70 | 2.00069 | 25.5 |
| 22 | 378.571 | (Variable) | | |
| 23 | 212.672 | 4.61 | 1.92286 | 20.9 |
| 24 | −36.603 | 1.30 | 1.90525 | 35.0 |
| 25 | 32.588 | (Variable) | | |
| 26 | 45.416 | 8.91 | 1.51633 | 64.1 |
| | −48.964 | (Variable) | | |
| 28 | −52.572 | 1.80 | 1.88300 | 40.8 |
| 29 | −314.780 | (Variable) | | |
| 30 | ∞ | 0.20 | 1.51633 | 64.1 |
| 31 | ∞ | (Variable) | | |
| Image Plane | ∞ | | | |

VARIOUS DATA
Zoom Ratio 2.67

| | Wide-Angle | Middle | Telephoto |
|---|---|---|---|
| Focal Length: | 73.00 | 135.00 | 195.00 |
| F-Number: | 2.88 | 2.88 | 2.88 |
| Half Angle of View (°): | 16.51 | 9.10 | 6.33 |
| Image Height: | 21.64 | 21.64 | 21.64 |
| Overall Lens Length: | 178.20 | 203.73 | 216.21 |
| sk | 19.12 | 26.34 | 33.67 |
| d 5 | 3.83 | 54.60 | 79.43 |
| d10 | 42.38 | 18.48 | 2.00 |
| d17 | 5.62 | 4.28 | 8.42 |
| d22 | 11.33 | 7.58 | 2.00 |
| d25 | 7.34 | 11.09 | 16.67 |
| d27 | 20.38 | 13.17 | 5.83 |
| d29 | 15.00 | 22.21 | 29.55 |
| d31 | 3.99 | 3.99 | 3.99 |

Zoom Lens Unit Data

| Lens Unit | Starting Surface | Focal Length: |
|---|---|---|
| 1 | 1 | 171.11 |
| 2 | 6 | −73.71 |
| 3 | 11 | 195.87 |
| 4 | 18 | 58.61 |
| 5 | 23 | −44.28 |
| 6 | 26 | 47.15 |
| 7 | 28 | −71.71 |
| 8 | 30 | ∞ |

Numerical Example 2

UNIT: mm

Surface Data

| Surface No. | r | d | nd | vd |
|---|---|---|---|---|
| 1 | 82.966 | 2.90 | 2.00069 | 25.5 |
| 2 | 69.557 | 10.16 | 1.43875 | 94.7 |
| 3 | 2233.248 | 1.00 | | |
| 4 | 153.356 | 3.58 | 1.53775 | 74.7 |
| 5 | 389.429 | (Variable) | | |
| 6 | −322.755 | 1.50 | 1.54072 | 47.2 |
| 7 | 61.557 | 6.16 | | |
| 8 | −83.812 | 1.50 | 1.56384 | 60.7 |
| 9 | 65.479 | 3.16 | 2.00069 | 25.5 |
| 10 | 304.050 | (Variable) | | |
| 11 (Diaphragm) | ∞ | (Variable) | | |
| 12 | 65.027 | 4.80 | 1.85150 | 40.8 |
| 13 | −138.057 | 1.77 | | |
| 14 | −51.477 | 1.50 | 1.74077 | 27.8 |
| 15 | 61.753 | 0.20 | | |
| 16 | 51.535 | 3.48 | 1.88300 | 40.8 |
| 17 | 194.910 | (Variable) | | |
| 18 | −402.524 | 3.64 | 2.00330 | 28.3 |
| 19 | −54.926 | 0.20 | | |
| 20 | 51.153 | 7.06 | 1.60311 | 60.6 |
| 21 | −39.556 | 1.70 | 2.00069 | 25.5 |
| 22 | 379.488 | (Variable) | | |
| 23 | 236.282 | 5.17 | 1.92286 | 20.9 |
| 24 | −31.120 | 1.30 | 1.90525 | 35.0 |
| 25 | 31.079 | (Variable) | | |
| 26 | 43.402 | 9.23 | 1.51633 | 64.1 |
| 27 | −46.442 | (Variable) | | |
| 28 | −51.385 | 1.80 | 1.90043 | 37.4 |
| 29 | −293.245 | (Variable) | | |
| 30 | ∞ | 0.20 | 1.51633 | 64.1 |
| 31 | ∞ | (Variable) | | |
| Image Plane | ∞ | | | |

VARIOUS DATA
Zoom Ratio 2.67

| | Wide-Angle | Middle | Telephoto |
|---|---|---|---|
| Focal Length: | 73.00 | 135.00 | 195.00 |
| F-Number: | 2.88 | 2.88 | 2.88 |
| Half Angle of View (°): | 16.51 | 9.10 | 6.33 |
| Image Height: | 21.64 | 21.64 | 21.64 |
| Overall Lens Length: | 178.20 | 204.60 | 216.83 |
| sk | 19.93 | 27.06 | 34.02 |
| d 5 | 3.83 | 52.89 | 75.63 |
| d10 | 35.16 | 12.50 | 2.00 |
| d11 | 6.96 | 7.19 | 2.00 |
| d17 | 4.53 | 4.30 | 9.49 |
| d22 | 10.36 | 6.94 | 2.00 |
| d25 | 6.76 | 10.18 | 15.12 |
| d27 | 18.85 | 11.72 | 4.77 |
| d29 | 13.78 | 20.91 | 27.87 |
| d31 | 6.02 | 6.02 | 6.02 |

Zoom Lens Unit Data

| Lens Unit | Starting Surface | Focal Length: |
|---|---|---|
| 1 | 1 | 167.28 |
| 2 | 6 | −71.23 |
| 3 | 12 | 158.71 |
| 4 | 18 | 60.44 |
| 5 | 23 | −41.21 |
| 6 | 26 | 45.03 |
| 7 | 28 | −69.44 |
| 8 | 30 | ∞ |

Numerical Example 3

UNIT: mm

Surface Data

| Surface No. | r | d | nd | νd |
|---|---|---|---|---|
| 1 | 82.966 | 2.90 | 2.00069 | 25.5 |
| 2 | 69.557 | 10.16 | 1.43875 | 94.7 |
| 3 | 2233.248 | 1.00 | | |
| 4 | 153.356 | 3.58 | 1.53775 | 74.7 |
| 5 | 389.429 | (Variable) | | |
| 6 | −322.755 | 1.50 | 1.54072 | 47.2 |
| 7 | 61.557 | 6.16 | | |
| 8 | −83.812 | 1.50 | 1.56384 | 60.7 |
| 9 | 65.479 | 3.16 | 2.00069 | 25.5 |
| 10 | 304.050 | (Variable) | | |
| 11 (Diaphragm) | ∞ | (Variable) | | |
| 12 | 65.027 | 4.80 | 1.85150 | 40.8 |
| 13 | −138.057 | 1.77 | | |
| 14 | −51.477 | 1.50 | 1.74077 | 27.8 |
| 15 | 61.753 | 0.20 | | |
| 16 | 51.535 | 3.48 | 1.88300 | 40.8 |
| 17 | 194.910 | (Variable) | | |
| 18 | −402.524 | 3.64 | 2.00330 | 28.3 |
| 19 | −54.926 | 0.20 | | |
| 20 | 51.153 | 7.06 | 1.60311 | 60.6 |
| 21 | −39.556 | 1.70 | 2.00069 | 25.5 |
| 22 | 379.488 | (Variable) | | |
| 23 | 236.282 | 5.17 | 1.92286 | 20.9 |
| 24 | −31.120 | 1.30 | 1.90525 | 35.0 |
| 25 | 31.079 | (Variable) | | |
| 26 | 43.402 | 9.23 | 1.51633 | 64.1 |
| 27 | −46.442 | (Variable) | | |
| 28 | −51.385 | 1.80 | 1.90043 | 37.4 |
| 29 | −293.245 | (Variable) | 1 | |
| 30 | ∞ | 0.20 | 1.51633 | 64.1 |
| 31 | ∞ | (Variable) | | |
| Image Plane | ∞ | | | |

VARIOUS DATA
Zoom Ratio 2.67

| | Wide-Angle | Middle | Telephoto |
|---|---|---|---|
| Focal Length: | 73.00 | 135.00 | 195.00 |
| F-Number: | 2.88 | 2.88 | 2.88 |
| Half Angle of View (°): | 16.51 | 9.10 | 6.33 |
| Image Height: | 21.64 | 21.64 | 21.64 |
| Overall Lens Length: | 178.20 | 204.60 | 2.16.83 |
| sk | 19.93 | 27.06 | 34.02 |
| d 5 | 3.83 | 52.89 | 75.63 |
| d10 | 35.16 | 12.50 | 2.00 |
| d11 | 6.96 | 7.19 | 2.00 |
| d17 | 4.53 | 4.30 | 9.49 |
| d22 | 10.36 | 6.94 | 2.00 |
| d25 | 6.76 | 10.18 | 15.12 |
| d27 | 18.85 | 11.72 | 4.77 |
| d29 | 13.78 | 20.91 | 27.87 |
| d31 | 6.02 | 6.02 | 6.02 |

Zoom Lens Unit Data

| Lens Unit | Starting Surface | Focal Length: |
|---|---|---|
| 1 | 1 | 167.28 |
| 2 | 6 | −71.23 |
| 3 | 12 | 158.71 |
| 4 | 18 | 60.44 |
| 5 | 23 | −41.21 |
| 6 | 26 | 45.03 |
| 7 | 28 | −69.44 |
| 8 | 30 | ∞ |

Numerical Example 4

UNIT: mm

Surface Data

| Surface No. | r | d | nd | νd |
|---|---|---|---|---|
| 1 | 92.312 | 2.90 | 1.85478 | 24.8 |
| 2 | 70.088 | 10.66 | 1.43875 | 94.7 |
| 3 | −2073.607 | (Variable) | | |
| 4 | 69.082 | 7.62 | 1.49700 | 81.5 |
| 5 | 500.594 | (Variable) | | |
| 6 | −27099.337 | 1.50 | 1.63930 | 44.9 |
| 7 | 55.029 | 3.81 | | |
| 8 | −103.351 | 1.50 | 1.71999 | 50.2 |
| 9 | 42.906 | 3.81 | 1.89286 | 20.4 |
| 10 | 129.140 | (Variable) | | |
| 11 | 77.231 | 5.02 | 1.85150 | 40.8 |
| 12 | −89.699 | 1.28 | | |
| 13 | −51.648 | 1.50 | 1.74077 | 27.8 |
| 14 | 57.745 | 0.20 | | |
| 15 | 54.109 | 3.45 | 2.00100 | 29.1 |
| 16 | 234.314 | (Variable) | | |
| 17 (Diaphragm) | ∞ | 2.08 | | |
| 18 | −1442.673 | 3.80 | 1.90043 | 37.4 |
| 19 | −56.569 | 0.20 | | |
| 20 | 44.027 | 7.02 | 1.59522 | 67.7 |
| 21 | −43.323 | 1.70 | 2.00069 | 25.5 |
| 22 | 300.867 | (Variable) | | |
| 23 | 387.579 | 3.63 | 1.85896 | 22.7 |
| 24 | −38.061 | 1.30 | 1.85150 | 40.8 |
| 25 | 30.465 | (Variable) | | |
| 26 | 58.401 | 8.23 | 1.56883 | 56.4 |
| 27 | −40.643 | (Variable) | | |
| 28 | −50.173 | 1.80 | 1.88300 | 40.8 |
| 29 | −500.000 | (Variable) | | |
| 30 | ∞ | 0.20 | 1.51633 | 64.1 |
| 31 | ∞ | (Variable) | | |
| Image Plane | ∞ | | | |

VARIOUS DATA
Zoom Ratio 2.67

| | Wide-Angle | Middle | Telephoto |
|---|---|---|---|
| Focal Length: | 73.00 | 130.00 | 195.00 |
| F-Number: | 2.88 | 2.88 | 2.88 |
| Half Angle of View (°): | 16.51 | 9.45 | 6.33 |
| Image Height: | 21.64 | 21.64 | 21.64 |
| Overall Lens Length: | 178.20 | 190.55 | 198.20 |
| sk | 18.65 | 25.30 | 33.73 |
| d 3 | 1.00 | 13.35 | 21.00 |
| d 5 | 3.00 | 24.57 | 37.92 |
| d10 | 34.13 | 17.53 | 4.18 |
| d16 | 6.98 | 2.00 | 2.00 |
| d22 | 11.62 | 8.23 | 2.00 |
| d25 | 12.23 | 15.61 | 21.84 |
| d27 | 17.60 | 10.95 | 2.52 |
| d29 | 13.87 | 20.52 | 28.95 |
| d31 | 4.65 | 4.65 | 4.65 |

Zoom Lens Unit Data

| Lens Unit | Starting Surface | Focal Length: |
|---|---|---|
| 1A | 1 | 276.78 |
| 1B | 4 | 160.31 |
| 1 | 1 | 104.18 |
| 2 | 6 | −45.08 |
| 3 | 11 | 123.33 |
| 4 | 17 | 56.14 |
| 5 | 23 | −39.42 |
| 6 | 26 | 43.44 |
| 7 | 28 | −63.28 |
| 8 | 30 | ∞ |

Numerical Example 5

UNIT: mm

Surface Data

| Surface No. | r | d | nd | vd |
|---|---|---|---|---|
| 1 | 92.854 | 2.90 | 1.85478 | 24.8 |
| 2 | 76.349 | 9.34 | 1.43875 | 94.7 |
| 3 | 2132.413 | (Variable) | | |
| 4 | 91.057 | 4.86 | 1.49700 | 81.5 |
| 5 | 669.503 | (Variable) | | |
| 6 | −312.420 | 1.50 | 1.76200 | 40.1 |
| 7 | 60.146 | 3.74 | | |
| 8 | −85.768 | 1.50 | 1.61772 | 49.8 |
| 9 | 54.938 | 3.96 | 2.00069 | 25.5 |
| 10 | 673.930 | (Variable) | | |
| 11 (Diaphragm) | ∞ | 1.00 | | |
| 12 | 73.511 | 4.37 | 1.85150 | 40.8 |
| 13 | −169.528 | 1.85 | | |
| 14 | −54.502 | 1.50 | 1.76182 | 26.5 |
| 15 | 46.881 | 0.56 | | |
| 16 | 46.167 | 4.86 | 2.00100 | 29.1 |
| 17 | −1705.381 | (Variable) | | |
| 18 | −202.840 | 3.10 | 2.00330 | 28.3 |
| 19 | −57.967 | 0.20 | | |
| 20 | 54.407 | 7.03 | 1.59522 | 67.7 |
| 21 | −37.608 | 1.70 | 2.00069 | 25.5 |
| 22 | 1034.169 | (Variable) | | |
| 23 | 263.032 | 3.32 | 1.92286 | 20.9 |
| 24 | −58.168 | 1.30 | 1.85150 | 40.8 |
| 25 | 31.744 | (Variable) | | |
| 26 | 44.566 | 9.23 | 1.48749 | 70.2 |
| 27 | −44.338 | (Variable) | | |
| 28 | −47.760 | 1.80 | 1.74320 | 49.3 |
| 29 | −500.000 | (Variable) | | |
| 30 | ∞ | 0.20 | 1.51633 | 64.1 |
| 31 | ∞ | (Variable) | | |
| Image Plane | ∞ | | | |

VARIOUS DATA
Zoom Ratio 2.67

| | Wide-Angle | Middle | Telephoto |
|---|---|---|---|
| Focal Length: | 73.00 | 130.00 | 195.00 |
| F-Number: | 2.88 | 2.88 | 2.88 |
| Half Angle of View (°): | 16.51 | 9.45 | 6.33 |
| Image Height: | 21.64 | 21.64 | 21.64 |
| Overall Lens Length: | 177.25 | 211.45 | 230.53 |
| sk | 20.34 | 27.76 | 35.90 |
| d 3 | 1.00 | 35.20 | 54.28 |
| d 5 | 3.53 | 24.43 | 36.10 |
| d10 | 38.22 | 19.02 | 2.39 |
| d17 | 6.30 | 4.59 | 9.56 |
| d22 | 10.84 | 7.58 | 2.00 |
| d25 | 7.73 | 11.00 | 16.58 |
| d27 | 19.68 | 12.26 | 4.12 |
| d29 | 13.79 | 21.21 | 29.35 |
| d31 | 6.42 | 6.42 | 6.42 |

Zoom Lens Unit Data

| Lens Unit | Starting Surface | Focal Length: |
|---|---|---|
| 1A | 1 | 274.93 |
| 1B | 4 | 211.47 |
| 1 | 1 | 122.36 |
| 2 | 6 | −59.24 |
| 3 | 11 | 110.01 |
| 4 | 18 | 77.47 |
| 5 | 23 | −45.78 |
| 6 | 26 | 47.20 |
| 7 | 28 | −71.17 |
| 8 | 30 | ∞ |

TABLE 1

| | | Ex. 1 | Ex. 2 | Ex. 3 | Ex. 4 | Ex. 5 |
|---|---|---|---|---|---|---|
| | fw | 73.000 | 73.000 | 73.000 | 73.000 | 73.000 |
| | ft | 195.000 | 195.000 | 195.000 | 195.000 | 195.000 |
| | wsk | 19.123 | 19.932 | 19.942 | 18.654 | 20.342 |
| | f1 | 171.111 | 167.277 | 229.919 | 104.182 | 122.369 |
| | f2 | −73.714 | −71.229 | −91.828 | −45.083 | −59.240 |
| | f3 | 195.868 | 158.707 | 72.836 | 123.332 | 110.007 |
| | f4 | 58.610 | 60.441 | 114.768 | 56.142 | 77.470 |
| | f5 | −44.282 | −41.208 | −32.391 | −39.415 | −45.779 |
| | f6 | 47.149 | 45.027 | 42.987 | 43.438 | 47.198 |
| | f7 | −71.707 | −69.437 | −86.610 | −63.277 | −71.169 |
| (1) | f1/|f2| | 2.321 | 2.348 | 2.504 | 2.311 | 2.066 |
| (2) | |f2|/wsk | 3.855 | 3.574 | 4.605 | 2.417 | 2.912 |
| (3) | f3/f4 | 3.342 | 2.626 | 0.635 | 2.197 | 1.420 |
| (4) | f1/|f5| | 3.864 | 4.059 | 7.098 | 2.643 | 2.673 |
| (5) | f6/|f7| | 0.658 | 0.648 | 0.496 | 0.686 | 0.663 |
| (6) | f1/f3 | 0.874 | 1.054 | 3.157 | 0.845 | 1.112 |
| (7) | f1/|f7| | 2.386 | 2.409 | 2.655 | 1.646 | 1.719 |
| (8) | |f2|/f6 | 1.563 | 1.582 | 2.136 | 1.038 | 1.255 |
| (9) | |f7|/wsk | 3.750 | 3.484 | 4.343 | 3.392 | 3.499 |
| (10) | f3/|f2| | 2.657 | 2.228 | 0.793 | 2.736 | 1.857 |
| (11) | |f2|/fw | 1.010 | 0.976 | 1.258 | 0.618 | 0.812 |
| (12) | |f5|/ft | 0.227 | 0.211 | 0.166 | 0.202 | 0.235 |
| (13) | f6/ft | 0.242 | 0.231 | 0.220 | 0.223 | 0.242 |

Figure 11:
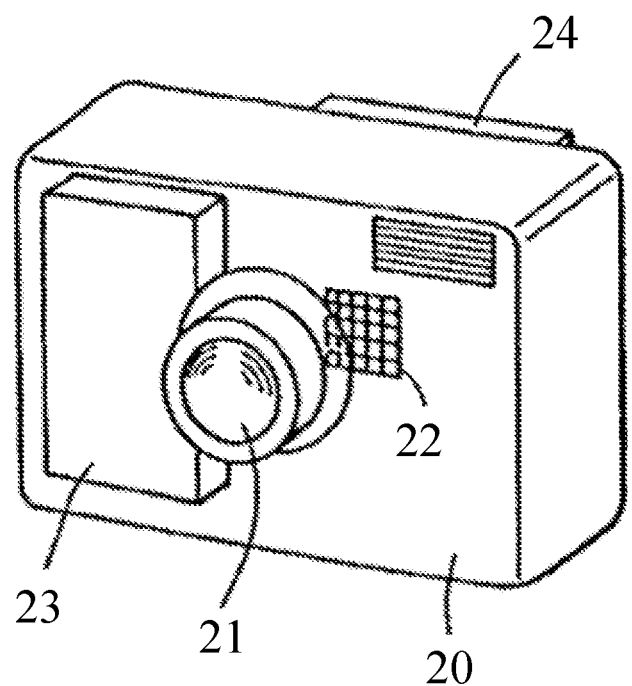
FIG. 11 is a schematic view of an image pickup apparatus provided with any one of the zoom lenses according to Examples 1 to 5.

FIG. 11 illustrates a digital still camera as an image pickup apparatus using the zoom lens according to each example for an image pickup optical system. Reference numeral 20 denotes a camera body, and reference numeral 21 denotes an imaging optical system including the zoom lens according to any one of Examples 1 to 5. Reference numeral 22 denotes a solid-state image sensor such as a CCD sensor or a CMOS sensor, which is built in the camera body 20 and captures an optical image (object image) formed by the imaging optical system 21. Reference numeral 23 denotes a recorder configured to record image data generated by processing an imaging signal from the image sensor 22, and reference numeral 24 denotes a rear display unit for displaying the image data.

The zoom lens according to each example can provide a compact camera having a high optical performance.

The camera may be a single-lens reflex camera having a quick turn mirror, or a mirrorless camera having no quick turn mirror.

Each example can provide a zoom lens having a high zoom ratio, a good optical performance, and a bright F-number.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-078301, filed on Apr. 27, 2020, which is hereby incorporated by reference herein in its entirety.

What is claimed is:

1. A zoom lens consisting of a plurality of lens units, the plurality of lens units consisting of, in order from an object side to an image side:
    a first lens unit having a positive refractive power;
    a second lens unit having a negative refractive power;
    a third lens unit having a positive refractive power;
    a fourth lens unit having a positive refractive power;
    a fifth lens unit having a negative refractive power;
    a sixth lens unit having a positive refractive power; and
    a seventh lens unit having a negative refractive power, wherein during zooming, a distance between adjacent lens units changes, and wherein during zooming, the first lens unit, the second lens unit, and a plurality of lens units among the third to seventh lens units move with respect to an image plane, and at least one of the fourth to seventh lens units is fixed with respect to the image plane, and wherein the following condition is satisfied:

$$2.290 \leq |f7|/wsk \leq 5.650,$$

where f7 is a focal length of the seventh lens unit, and wsk is a back focus of the zoom lens at a wide-angle end.

2. The zoom lens according to claim 1, wherein the fifth lens unit moves during focusing.

3. The zoom lens according to claim 1, wherein the sixth lens unit is fixed during zooming.

4. The zoom lens according to claim 1, wherein the fourth lens unit is fixed during zooming.

5. The zoom lens according to claim 1, wherein the following condition is satisfied:

$$1.440 \leq f1/|f2| \leq 3.260$$

where f1 is a focal length of the first lens unit, and f2 is a focal length of the second lens unit.

6. The zoom lens according to claim 1, wherein the following condition is satisfied:

$$1.690 \leq |f2|/wsk \leq 5.990$$

where f2 is a focal length of the second lens unit, and wsk is a backfocus of the zoom lens at a wide-angle end.

7. The zoom lens according to claim 1, wherein the following condition is satisfied:

$$0.440 \leq f3/f4 \leq 4.350$$

where f3 is a focal length of the third lens unit, and f4 is a focal length of the fourth lens unit.

8. The zoom lens according to claim 1, wherein the following condition is satisfied:

$$1.850 \leq f1/|f5| \leq 9.230$$

where f1 is a focal length of the first lens unit, and f5 is a focal length of the fifth lens unit.

9. The zoom lens according to claim 1, wherein the following condition is satisfied:

$$0.340 \leq f6/|f7| \leq 0.900$$

where f6 is a focal length of the sixth lens unit, and f7 is a focal length of the seventh lens unit.

10. The zoom lens according to claim 1, wherein the following condition is satisfied:

$$0.590 \leq f1/f3 \leq 4.110$$

where f1 is a focal length of the first lens unit, and f3 is a focal length of the third lens unit.

11. The zoom lens according to claim 1, wherein the following condition is satisfied:

$$1.150 \leq f1/|f7| \leq 3.460$$

where f1 is a focal length of the first lens unit, and f7 is a focal length of the seventh lens unit.

12. The zoom lens according to claim 1, wherein the following condition is satisfied:

$$0.720 \leq |f2|/f6 \leq 2.780$$

where f2 is a focal length of the second lens unit, and f6 is a focal length of the sixth lens unit.

13. The zoom lens according to claim 1, wherein the following condition is satisfied:

$$0.550 \leq f3/|f2| \leq 3.560$$

where f2 is a focal length of the second lens unit, and f3 is a focal length of the third lens unit.

14. The zoom lens according to claim 1, where the following condition is satisfied:

$$0.430 \leq |f2|/fw \leq 1.640$$

where f2 is a focal length of the second lens unit, and fw is a focal length of the zoom lens at a wide-angle end.

15. The zoom lens according to claim 1, wherein the following condition is satisfied:

$$0.110 \leq |f5|/ft \leq 0.310$$

where f5 is a focal length of the fifth lens unit, and ft is a focal length of the zoom lens at a telephoto end.

16. The zoom lens according to claim 1, wherein the following condition is satisfied:

$$0.150 \leq f6/ft \leq 0.320$$

where f6 is a focal length of the sixth lens unit, and ft is a focal length of the zoom lens at a telephoto end.

17. An image pickup apparatus comprising:
the zoom lens according to claim 1; and
an image sensor configured to receive light from the zoom lens.

18. The zoom lens according to claim 1, wherein the third lens unit includes two or more lenses.

19. The zoom lens according to claim 18, wherein the third lens unit includes a negative lens.

20. The zoom lens according to claim 19, wherein the negative lens is a biconcave lens.

21. A zoom lens consisting of a plurality of lens units, the plurality of lens units consisting of, in order from an object side to an image side:
a front first lens unit (1A) having a refractive power;
a rear first lens unit (1B) having a refractive power;
a second lens unit having a negative refractive power;
a third lens unit having a positive refractive power;
a fourth lens unit having a positive refractive power, the fourth lens unit being disposed next to the third lens unit on the image side;
a fifth lens unit having a negative refractive power;
a sixth lens unit having a positive refractive power; and
a seventh lens unit having a negative refractive power,
wherein a sign of a focal length of a combined system consisting of the front first lens unit (1A) and the rear first lens unit (1B) lens units at a wide-angle end separation from each other is positive,
wherein during zooming, a distance between adjacent lens units changes,
wherein no lens unit is disposed between the third and fourth lens units,
wherein during zooming, the front first lens unit (1A) lens unit, the second lens unit, and a plurality of lens units among the third to seventh lens units move with respect to an image plane, and at least one of the fourth to seventh lens units is fixed with respect to the image plane, and
wherein the following condition is satisfied:

$$2.290 \leq |f7|/wsk \leq 5.650,$$

where f7 is a focal length of the seventh lens unit, and wsk is a back focus of the zoom lens at a wide-angle end.

22. An image pickup apparatus comprising:
the zoom lens according to claim 21; and
an image sensor configured to receive light from the zoom lens.

23. The zoom lens according to claim 21, wherein the third lens unit includes two or more lenses.

24. The zoom lens according to claim 23, wherein the third lens unit includes a negative lens.

25. The zoom lens according to claim 24, wherein the negative lens is a biconcave lens.

* * * * *